United States Patent
Heo et al.

(10) Patent No.: US 12,058,318 B2
(45) Date of Patent: Aug. 6, 2024

(54) METHOD FOR CODING IMAGE/VIDEO ON BASIS OF INTRA PREDICTION AND DEVICE THEREFOR

(71) Applicant: LG Electronics Inc., Seoul (KR)

(72) Inventors: Jin Heo, Seoul (KR); Sunmi Yoo, Seoul (KR); Ling Li, Seoul (KR); Jangwon Choi, Seoul (KR)

(73) Assignee: LG Electronics Inc., Seoul (KR)

(*) Notice: Subject to any disclaimer, the term of this patent is extended or adjusted under 35 U.S.C. 154(b) by 3 days.

(21) Appl. No.: 18/112,259

(22) Filed: Feb. 21, 2023

(65) Prior Publication Data

US 2023/0199176 A1    Jun. 22, 2023

Related U.S. Application Data

(63) Continuation of application No. 17/703,366, filed on Mar. 24, 2022, now Pat. No. 11,632,544, which is a
(Continued)

(30) Foreign Application Priority Data

Mar. 16, 2018   (KR) .................. 10-2018-0030944
Mar. 30, 2018   (KR) .................. 10-2018-0037751

(51) Int. Cl.
*H04N 19/105*   (2014.01)
*H04N 19/159*   (2014.01)
(Continued)

(52) U.S. Cl.
CPC ......... *H04N 19/105* (2014.11); *H04N 19/159* (2014.11); *H04N 19/176* (2014.11); *H04N 19/46* (2014.11)

(58) Field of Classification Search
None
See application file for complete search history.

(56) References Cited

U.S. PATENT DOCUMENTS 9,584,830 B2    2/2017   Oh et al.
2018/0332284 A1* 11/2018  Liu .............. H04N 19/182
(Continued)

FOREIGN PATENT DOCUMENTS

KR   2016-0009109   1/2016
KR   2016-0052471   5/2016
(Continued)

OTHER PUBLICATIONS

Bross et al., "Versatile Video Coding (Draft 4)," JVET-M1001-v6, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 295 pages.
(Continued)

*Primary Examiner* — Talha M Nawaz
(74) *Attorney, Agent, or Firm* — Fish & Richardson P.C.

(57) ABSTRACT

An image decoding method according to the present disclosure comprises the steps of: obtaining intra prediction type related information for a current block from a bit stream; deriving the intra prediction type of the current block based on the intra prediction type-related information; obtaining intra prediction mode-related information for the current block from the bitstream; configuring a most probable mode (MPM) list including candidate intra prediction modes for the current block based on neighboring blocks of the current block; deriving the intra prediction mode of the current block based on the MPM list and the intra prediction mode-related information; and generating a predicted block of the current block based on the intra prediction type and the intra prediction mode, wherein when the intra prediction type indicates the particular intra prediction type, the MPM index is parsed from the bit stream without parsing of an MPM flag.

4 Claims, 23 Drawing Sheets

Related U.S. Application Data continuation of application No. 16/981,526, filed as application No. PCT/KR2019/003063 on Mar. 15, 2019, now Pat. No. 11,317,086.

(51) Int. Cl.
*H04N 19/176* (2014.01)
*H04N 19/46* (2014.01)

(56) References Cited

U.S. PATENT DOCUMENTS

2019/0387222 A1* 12/2019 Kim .................... H04N 19/593
2020/0007879 A1* 1/2020 Jiang ................... H04N 19/174
2020/0404302 A1* 12/2020 Heo ..................... H04N 19/46

FOREIGN PATENT DOCUMENTS

| KR | 2016-0055766 | 5/2016 |
| KR | 2017-0121303 | 11/2017 |
| KR | 2018-0008797 | 1/2018 |
| KR | 2018-0018570 | 2/2018 |
| KR | 2020-0063092 | 6/2020 |
| WO | WO 2017/188565 | 11/2017 |

OTHER PUBLICATIONS

Office Action in Indian Appln. No. 202017042069, dated Dec. 1, 2021, 5 pages.
Office action in Korean Application No. 10-2020-7025163, dated Jun. 24, 2022, 4 pages (with English translation).
Office Action in Korean Appln. No. 10-2020-7025163, dated Jan. 5, 2022, 15 pages (with English translation).

* cited by examiner (a)

Rough Mode Decision

1. RMD for even mode
   →N modes

2. RMD for +1 mode of selected N modes
   →N modes

3. RMD for LIP MPM 6 modes
   →N modes 4. add HEVC MPM candidates
   →N modes

Full RD min: N modes
max: N + M modes

METHOD FOR CODING IMAGE/VIDEO ON BASIS OF INTRA PREDICTION AND DEVICE THEREFOR

CROSS-REFERENCE TO RELATED APPLICATIONS

This application is a continuation of U.S. application Ser. No. 17/703,366, filed on Mar. 24, 2022, which is a continuation of U.S. application Ser. No. 16/981,526, filed on Sep. 16, 2020, now U.S. Pat. No. 11,317,086, which is a National Stage application under 35 U.S.C. § 371 of International Application No. PCT/KR2019/003063, filed on Mar. 15, 2019, which claims the benefit of Korean Patent Application No. 10-2018-0030944, filed on Mar. 16, 2018 and No. 10-2018-0037751, filed on Mar. 30, 2018, the contents of which are all hereby incorporated by reference herein in their entirety.

BACKGROUND OF THE DISCLOSURE

Field of the Disclosure

The present disclosure relates to an image coding technology, and more specifically, to an image/video coding method and apparatus based on intra prediction.

Related Art

In recent years, demands for high-resolution and high-quality images/videos, such as Ultra High Definition (UHD) images/videos of 4K or 8K or more, are increasing in various fields. As image/video data have high resolution and high quality, the amount of information or bits to be transmitted relatively increases compared to legacy image/video data, such that if image data is transmitted using a medium, such as a conventional wired/wireless broadband line, or image/video data are stored using a conventional storage medium, a transmission cost and a storage cost are increased.

In addition, in recent years, interests and demands for immersive media such as virtual reality (VR), artificial reality (AR) contents or holograms are increasing, and the broadcasts for images/videos having image characteristics different from the real images such as game images are increasing.

Therefore, there is a need for a highly efficient image/video compression technique for effectively compressing, transmitting, storing, and reproducing information of high resolution and high quality images/videos having the aforementioned various characteristics.

SUMMARY

An object of the present disclosure is to provide a method and an apparatus for enhancing image coding efficiency.

Another object of the present disclosure is to provide an efficient intra prediction method and apparatus.

Still another object of the present disclosure is to provide a method and an apparatus for efficiently signaling an intra prediction mode.

Yet another object of the present disclosure is to provide a method and an apparatus for adaptively deriving an intra prediction mode according to an intra prediction type.

An exemplary embodiment of the present disclosure provides an intra prediction method performed by an image decoding apparatus. The method includes: acquiring information about an intra prediction type of a current block from a bitstream, deriving the intra prediction type of the current block based on the information about the intra prediction type, acquiring information about an intra prediction mode of the current block from the bitstream, configuring a most probable mode (MPM) list including candidate intra prediction modes of the current block based on neighboring blocks of the current block, deriving the intra prediction mode of the current block based on the MPM list and the information about the intra prediction mode, and generating a predicted block of the current block based on the intra prediction type and the intra prediction mode, in which if the intra prediction type represents a specific intra prediction type, the information about the intra prediction mode includes: an MPM index, and if the intra prediction type represents the specific intra prediction type, the MPM index is parsed without parsing an MPM flag from the bitstream.

Another exemplary embodiment of the present disclosure provides an image decoding apparatus for performing intra prediction. The image decoding apparatus includes: an entropy decoder for acquiring information about an intra prediction type and information about an intra prediction mode of a current block from a bitstream, and a predictor for deriving an intra prediction type of the current block based on the information about the intra prediction type, configuring a most probable mode (MPM) list including candidate intra prediction modes of the current block based on neighboring blocks of the current block, deriving an intra prediction mode of the current block based on the MPM list and the information about the intra prediction mode, and generating a predicted block of the current block based on the intra prediction type and the intra prediction mode, in which if the intra prediction type represents a specific intra prediction type, the information about the intra prediction mode includes: an MPM index, and if the intra prediction type represents the specific intra prediction type, the MPM index is parsed without parsing an MPM flag from the bitstream.

Still another exemplary embodiment of the present disclosure provides an image encoding method performed by an image encoding apparatus. The method includes: determining an intra prediction type of a current block, generating information about the intra prediction type of the current block, configuring a most probable mode (MPM) list including candidate intra prediction modes of the current block based on neighboring blocks of the current block, deriving an intra prediction mode of the current block based on the MPM list, generating information about the intra prediction mode of the current block, and outputting a bitstream by encoding image information including the information about the intra prediction type and the information about the intra prediction mode, in which the information about the intra prediction mode is generated based on the intra prediction type, if the intra prediction type represents a specific intra prediction type, the information about the intra prediction mode includes: an MPM index, and the intra prediction mode of the current block is limited to one of candidate intra prediction modes within the MPM list.

Yet exemplary embodiment of the present disclosure provides an image encoding apparatus for performing an image encoding. The image encoding apparatus includes: a predictor for determining an intra prediction type of a current block, generating information about the intra prediction type of the current block, configuring a most probable mode (MPM) list including candidate intra prediction modes of the current block based on neighboring blocks of the current block, deriving an intra prediction mode of the current block based on the MPM list, and generating information about the intra prediction mode of the current block, and an entropy encoder for outputting a bitstream by encoding image information including the information about the intra prediction type and the information about the intra prediction mode, in which the information about the intra prediction mode is generated based on the intra prediction type, if the intra prediction type represents a specific intra prediction type, the information about the intra prediction mode includes: an MPM index, and the intra prediction mode of the current block is limited to one of the candidate intra prediction modes within the MPM list.

The present disclosure may enhance the overall image/video compression efficiency.

The present disclosure may decrease the amount of data to be transmitted necessary for the residual processing through the efficient prediction, and enhance the residual coding efficiency.

The present disclosure may decrease the computational complexity and efficiently derive the intra prediction mode.

The present disclosure may decrease the amount of data necessary for signaling the intra prediction mode.

BRIEF DESCRIPTION OF THE DRAWINGS

FIG. 15 illustrates a method for determining a candidate mode to be used for different Full RD in the example of the present disclosure.

DESCRIPTION OF EXEMPLARY EMBODIMENTS

Figure 1:
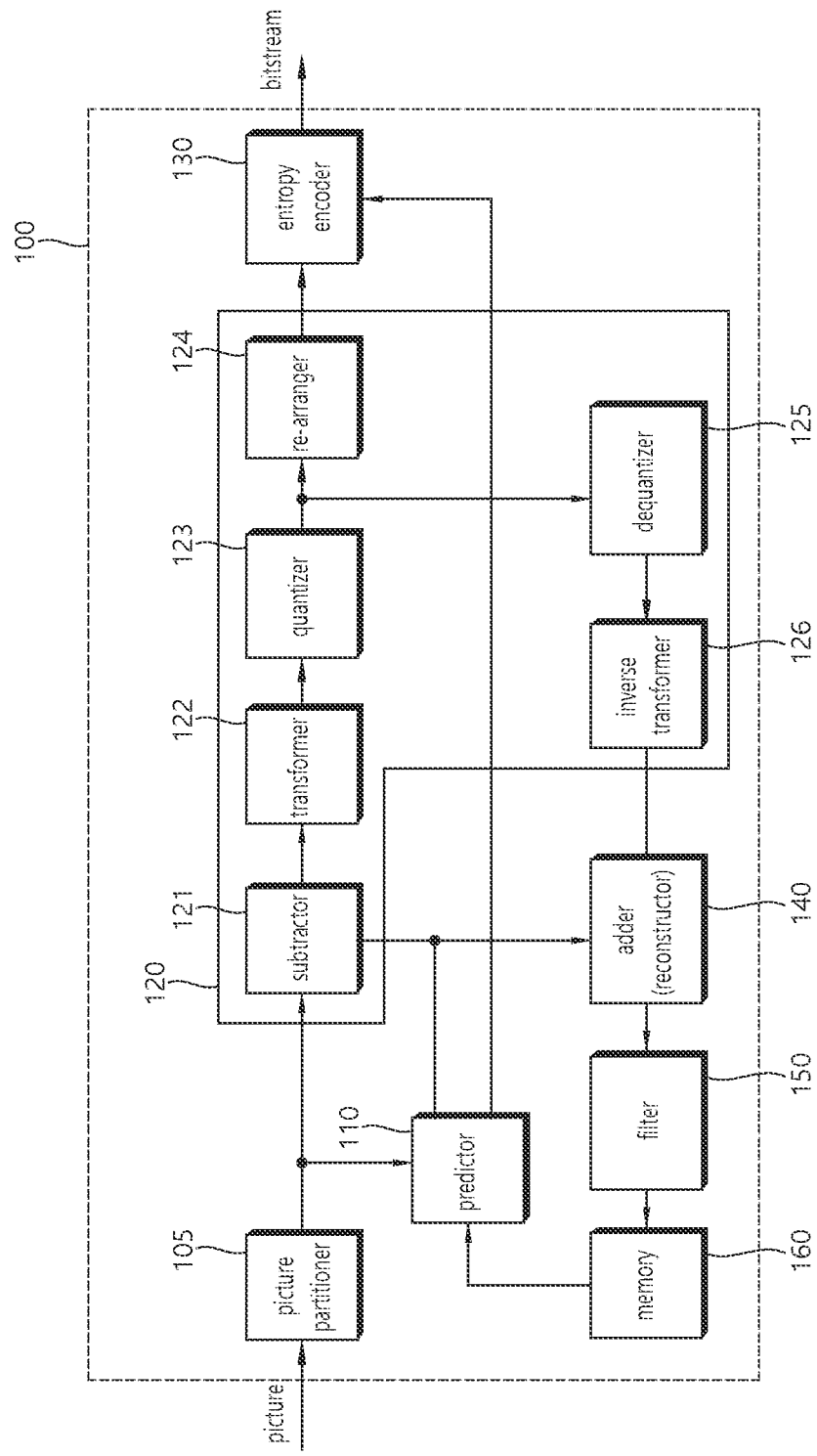
FIG. 1 schematically illustrates a configuration of a video/image encoding apparatus to which the present disclosure is applicable.

An exemplary embodiment of the present disclosure provides an image information decoding method performed by a decoding apparatus. The method includes: decoding a non-separable secondary transform (NSST) index from a bitstream, if an NSST is applied to a target block, decoding information about transform coefficients for the target block from the bitstream, based on the decoded NSST index, and deriving the transform coefficients for the target block based on the decoded information about the transform coefficients, in which the NSST index is decoded prior to the information about the transform coefficients for the target block.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded Hereinafter, examples of the present embodiment will be described in detail with reference to the accompanying drawings. In addition, like reference numerals are used to indicate like elements throughout the drawings, and the same descriptions on the like elements will be omitted.

In the present specification, a video may mean a group of a series of images with time. A picture generally means a unit of representing one image in a specific time zone, and a slice means a unit of configuring a part of the picture in coding. One picture may be composed of a plurality of slice or tile groups, and the picture, slice, and tile groups may be interchangeably used as necessary. In this document, the image may be a still image, and may also represent an image of a specific time configuring a video. Hereinafter, an image coding may be interchangeably used with a video coding. In addition, the image coding may be interchangeably used with a picture coding or a frame coding.

A pixel or a pel may mean a minimum unit configuring one picture (or image). In addition, as a term corresponding to the pixel, a 'sample' may be used. The sample may generally represent a pixel or a value of the pixel, also represent only the pixel/pixel value of a luma component, and also represent only the pixel/pixel value of a chroma component.

The unit represents a basic unit of an image processing. The unit may include at least one of a specific area of the picture and information related to the corresponding area. The unit may be interchangeably used with the term such as a block or an area case by case. Alternatively, the unit may include a luma component block and chroma component (cb, cr) blocks. Generally, an M×N block may represent samples composed of M columns and N rows or a group of transform coefficients.

FIG. 1 briefly illustrates a structure of a video/image encoding apparatus to which the present disclosure is applicable. Hereinafter, a video encoding apparatus may include an image encoding apparatus.

Referring to FIG. 1, a video encoding apparatus 100 may include a picture partitioner 105, a predictor 110, a residual processer 120, an entropy encoder 130, an adder 140, a filter 150, and a memory 160. The residual processer 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure, a binary tree structure and/or a ternary tree structure. In this case, for example, the quad tree structure may be first applied and the binary tree structure and ternary tree structure may be applied later. Alternatively, the binary tree structure/ternary tree structure may be applied first. The coding procedure according to the present embodiment may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transform, and reconstruction, which will be described later.

In another example, the processing unit may include a coding unit (CU) prediction unit (PU), or a transformer (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units less than the smallest coding unit. Here, the final coding unit refers to a coding unit which is partitioned or split to a prediction unit or a transformer. The prediction unit is a unit which is partitioned from a coding unit, and may be a unit of sample prediction. Here, the prediction unit may be divided into sub-blocks. The transformer may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transformer may be referred to as a transform block (TB). The prediction block or prediction unit may refer to a specific area in the form of a block in a picture and include an array of prediction samples. Also, the transform block or transformer may refer to a specific area in the form of a block in a picture and include the transform coefficient or an array of residual samples.

The predictor 110 may perform prediction on a processing target block (hereinafter, it may represent a current block or a residual block), and may generate a predicted block including prediction samples for the current block. A unit of prediction performed in the predictor 110 may be a coding block, or may be a transform block, or may be a prediction block.

The predictor 110 may determine whether intra prediction is applied or inter prediction is applied to the current block. For example, the predictor 110 may determine whether the intra prediction or the inter prediction is applied in unit of CU.

In case of the intra prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor to derive a motion vector of the current block.

In case of the inter prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, a highest picture in a reference picture list may be used as a reference picture. Reference pictures included in the reference picture list may be aligned based on a picture order count (POC)

difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transform based on the size of a corresponding transform block and a prediction mode applied to a coding block or prediction block spatially overlapping with the transform block. For example, residual samples may be transformed using discrete sine transform (DST) transform kernel if intra prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding, according to an entropy encoding or according to a pred-configured method, together or separately on information (e.g., a syntax element value or the like) required for video reconstruction in addition to the quantized transform coefficients. The entropy-encoded information may be transmitted or stored in unit of a network abstraction layer (NAL) in a bit stream form. The bitstream may be transmitted via a network or be stored in a digital storage medium. Here, the network may include a broadcasting network or a communications network, the digital storage medium may include various storage medium such as USB, SD, CD, DVD, blue-ray, HDD, SDD and so on.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter prediction. Here, pictures used for inter prediction may be designated according to a reference picture set or a reference picture list.

Figure 2:
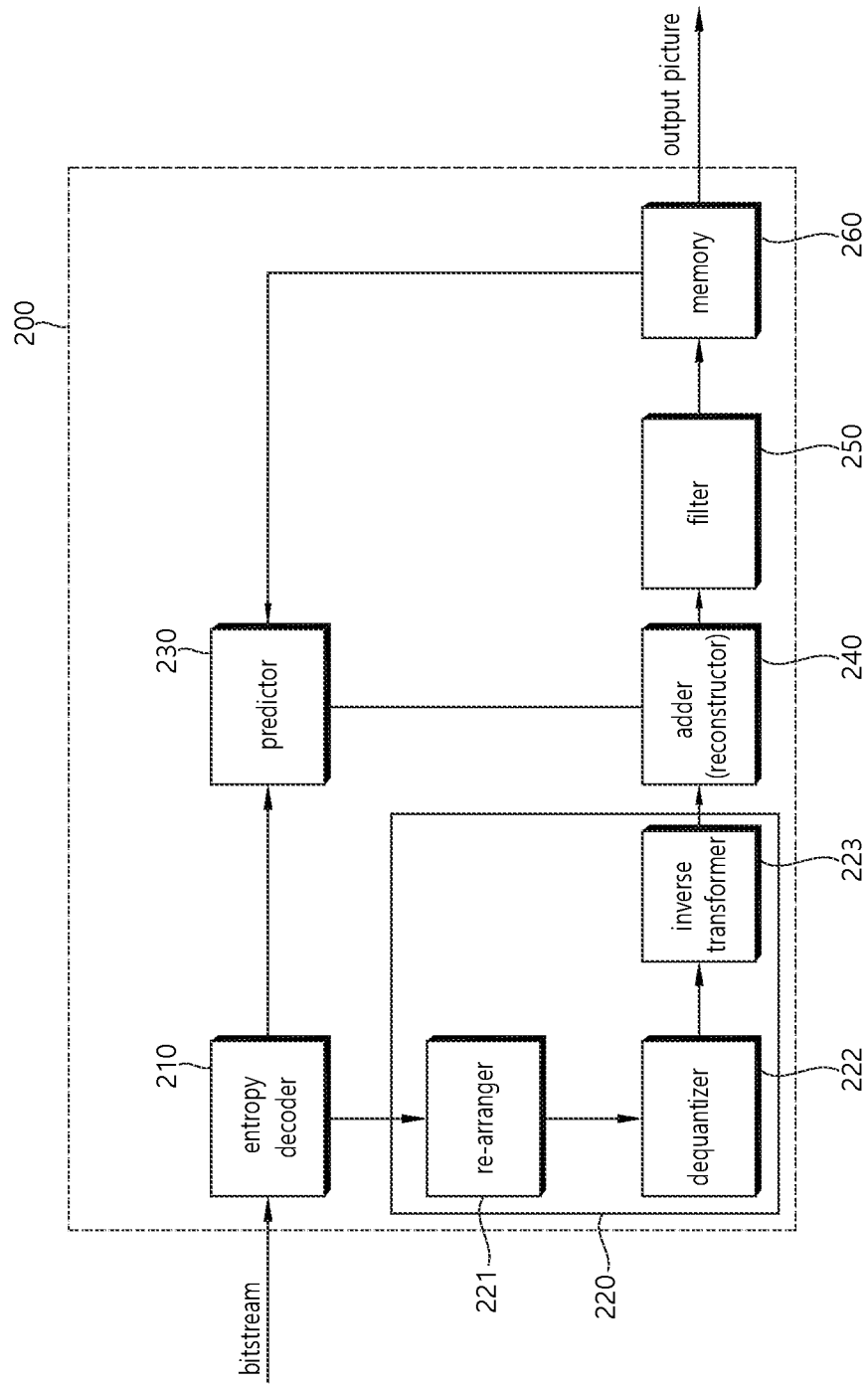
FIG. 2 schematically illustrates a configuration of a video/image decoding apparatus to which the present disclosure is applicable.

FIG. 2 briefly illustrates a structure of a video/image decoding apparatus to which the present disclosure is applicable. Hereinafter, a video decoding apparatus may include an image decoding apparatus.

Referring to FIG. 2, a video decoding apparatus 200 may include an entropy decoder 210, a residual processor 220, a predictor 230, an adder 240, a filter 250, and a memory 260. The residual processor 220 may include a re-arranger 221, a dequantizer 222, and an inverse transformer 223. In addition, although it is not depicted, the video decoding apparatus 200 may include a receiver for receiving a bitstream including video information. The receiver may be configured as a separate module or may be included in the entropy decoder 210.

When a bit stream including video/image information is input, the video decoding apparatus 200 may reconstruct a video/image/picture in association with a process by which video information is processed in the video encoding apparatus.

For example, the video decoding apparatus 200 may perform video decoding using a processing unit applied in the video encoding apparatus. Thus, the processing unit block of video decoding may be, for example, a coding unit and, in another example, a coding unit, a prediction unit or a transformer. The coding unit may be split from the largest coding unit according to the quad tree structure and/or the binary tree structure and/or ternary tree structure.

A prediction unit and a transformer may be further used in some cases, and in this case, the prediction block is a block derived or partitioned from the coding unit and may be a unit of sample prediction. Here, the prediction unit may be divided into sub-blocks. The transformer may be split from the coding unit according to the quad tree structure and may be a unit that derives a transform coefficient or a unit that derives a residual signal from the transform coefficient.

The entropy decoder 210 may parse the bit stream to output information required for video reconstruction or picture reconstruction. For example, the entropy decoder 210 may decode information in the bit stream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bit stream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra prediction or inter prediction based on information about a prediction. In this case, a unit for determining which one will be used between the intra prediction and the inter prediction may be different from a unit for generating a prediction sample. In addition, a unit for generating the prediction sample may also be different in the inter prediction and the intra prediction. For example, which one will be applied between the inter prediction and the intra prediction may be determined in unit of CU. In addition, for example, in the inter prediction, the prediction sample may be generated by determining the prediction mode in unit of PU, and in the intra prediction, the prediction sample may be generated in unit of TU by determining the prediction mode in unit of PU.

In case of the intra prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra prediction mode of a neighboring block.

In the case of inter prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter prediction of the current block provided by the video encoding apparatus, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. In the skip mode and the merge mode, a firstly-ordered picture in the reference picture list may be used as a reference picture when motion information of a temporal neighboring block is used.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bit stream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter prediction. Here, the pictures used for inter prediction may be designated according to a reference picture set or a reference picture list. A reconstructed picture may be used as a reference picture for other pictures. The memory 260 may output reconstructed pictures in an output order.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Meanwhile, if the intra prediction is applied to the current block, as described above, the encoding apparatus/decoding apparatus may derive the intra prediction mode of the current block, and derive the predicted block including prediction samples of the current block based on the intra prediction mode. That is, the encoding apparatus/decoding apparatus may derive the prediction samples of the current block by applying the intra prediction mode (for example, directional mode or non-directional mode) based on neighboring reference samples of the current block.

Figure 3:
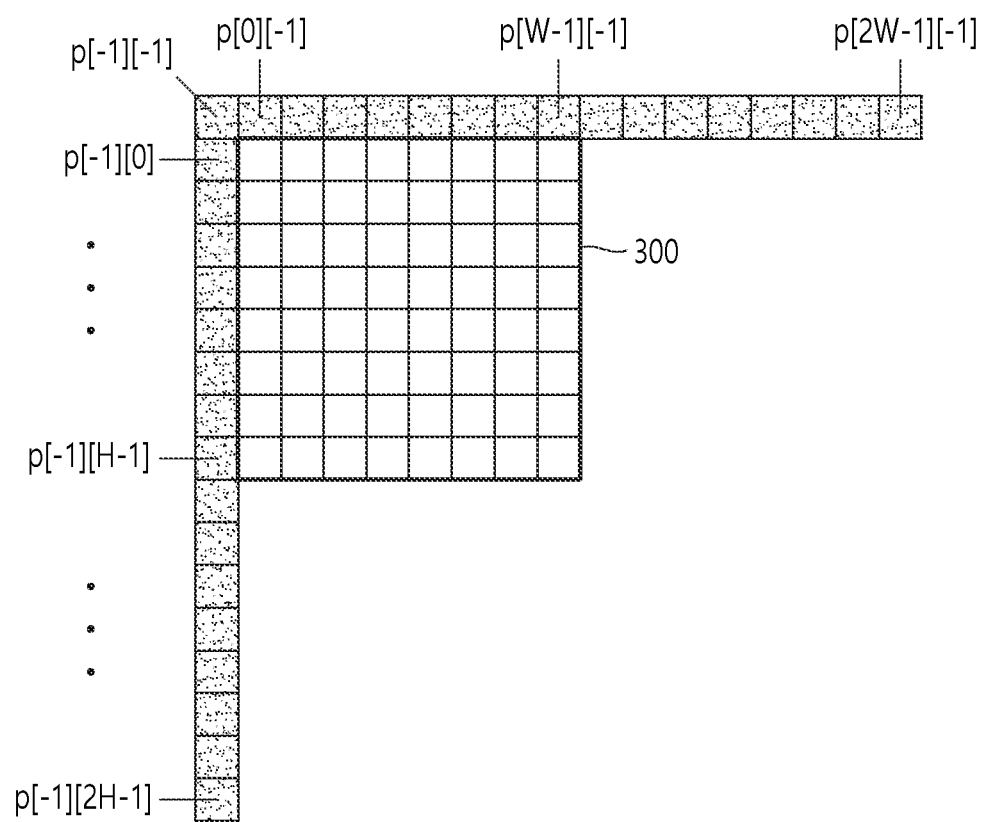
FIG. 3 illustrates an example of neighboring reference samples which may be used in performing an intra prediction.

FIG. 3 illustrates an example of the neighboring reference samples which may be used in performing the intra prediction.

Referring to FIG. 3, as neighboring (reference) samples for the intra prediction of a current block 300, left neighboring samples p[−1][2H−1] . . . p[−1][0], top-left neighboring samples p[−1][−1], and top neighboring samples p[0][−1] . . . p[2W−1][−1] may be derived. Here, p[m][n] represents a sample (or pixel) of a sample position (m, n), which may represent a relative sample position, when considering the top-left sample position of the current block as (0, 0). In addition, here, W and H represent the width and height of the current block 300, respectively. The current block 300 may correspond to a coding unit (coding block) or a transform unit (transform block).

Meanwhile, if there is a sample not available for the intra prediction among the neighboring samples p[−1][2H−1] . . . p[−1][−1] . . . p[2W−1][−1], the corresponding non-available sample may be filled with an available sample through a substitution or padding procedure. In this case, for example, the non-available sample may be substituted or padded with another neighboring sample adjacent to the corresponding sample.

Here, as an example, if the corresponding sample is located outside the picture, the corresponding sample may be a non-available sample. For example, if the current block 300 is located on the edge of the picture, some of the neighboring samples may be not available. As another example, if another CU including the corresponding sample is not coded yet, the corresponding sample may be a non-available sample.

The substitution or padding procedure may be performed in the following order, for example.

1) If the neighboring samples p[1][2H−1] are not available, search is performed sequentially from the neighboring samples p[−1][2H−1] (or the neighboring samples p[−1][2H−2] top[−1][1]) top[−1][−1], and then sequentially from p[0][−1] to p[2 W−1][−1], and a value of the available neighboring sample first found may be assigned to the neighboring sample p[−1][2H−1].

2) Search is performed sequentially from x=−1, y=2H−2 to x=−1, y=−1, and if p[x][y] is not available, the value of the non-available p[x][y] may be substituted with a value of p[x][y+1].

3) Search is performed sequentially from x=0, y=−1 to x=2 W−1, y=−1, and if p[x][y] is not available, the value of the non-available p[x][y] may be substituted with a value of p[x−1][y].

If the intra prediction is applied, a prediction sample is derived using at least one neighboring sample according to an intra prediction mode based on a current block.

In this case, as an example, the intra prediction modes may include two non-directional (or non-angular) intra prediction modes and 33 directional (or angular) intra prediction modes as follows.

TABLE 1

| Intra prediction mode | Associated name |
| --- | --- |
| 0 | Intra planar |
| 1 | Intra DC |
| 2 . . . 34 | Intra angular 2 . . . intra angular 34 |

Here, a 0th intra prediction mode represents an intra planar mode, and a first intra prediction mode represents an intra DC mode. Second to 34th intra prediction modes represent an intra angular 2 mode . . . an intra angular 34 mode, respectively.

Here, the intra planar mode and the intra DC mode are non-directional prediction modes, and the intra angular 2 mode to the intra angular 34 mode are directional prediction modes.

Figure 4:
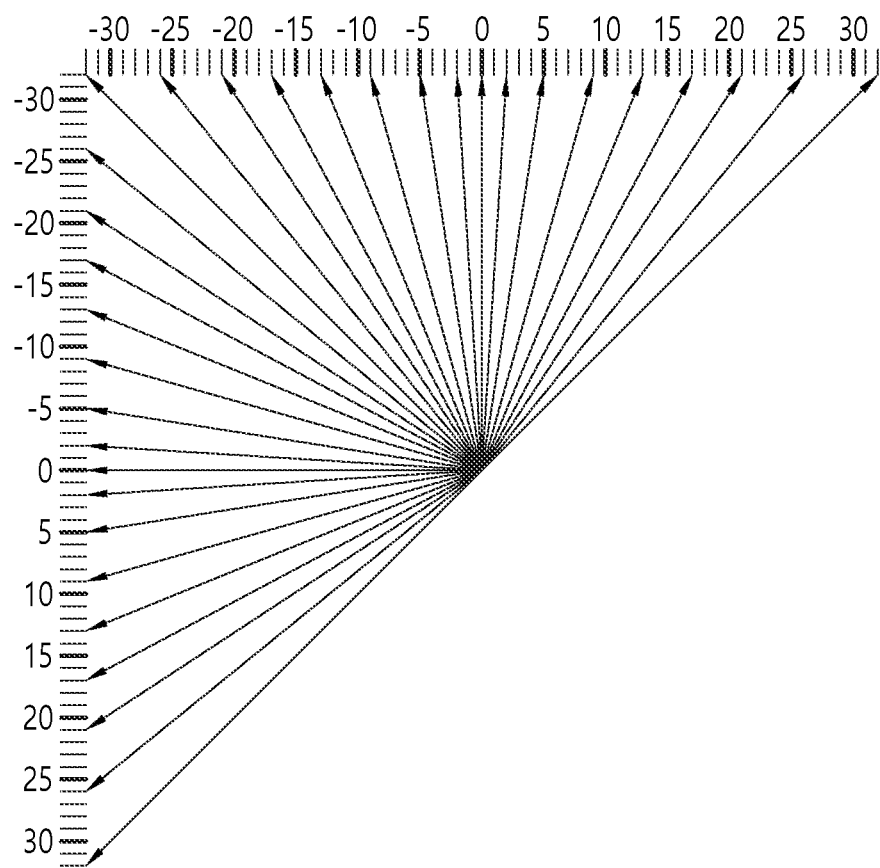
FIGS. 4 and 5 exemplarily illustrate intra prediction modes including 33 directional prediction modes and two non-directional prediction modes.
Figure 5:
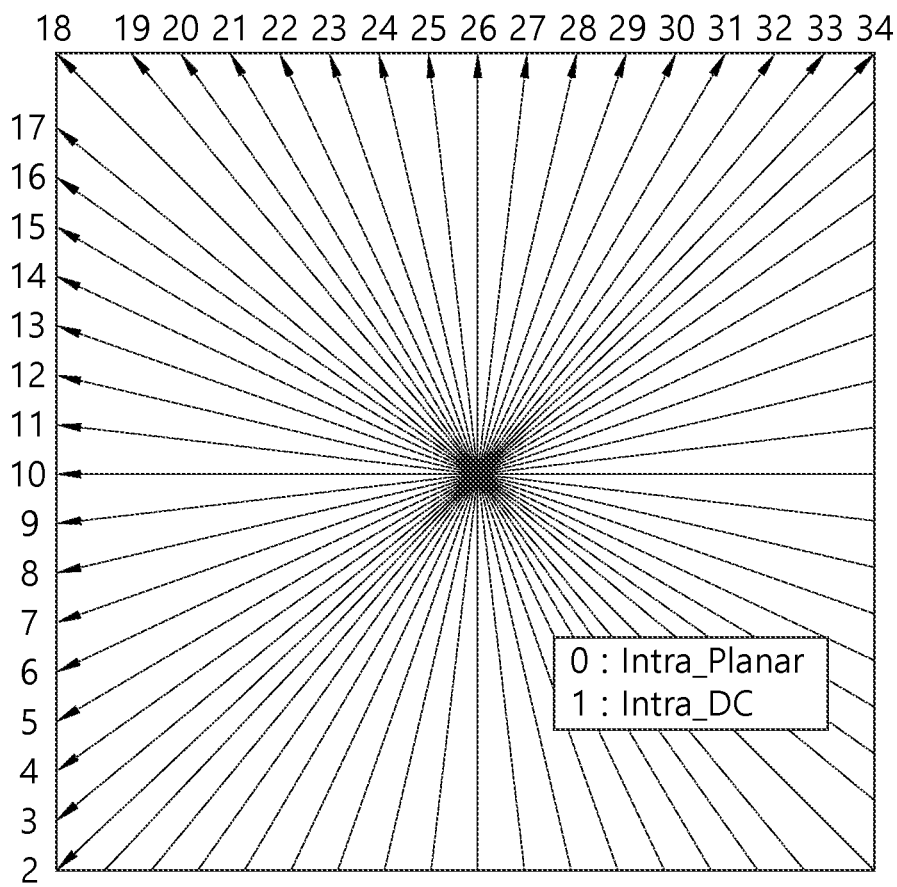

FIGS. 4 and 5 exemplarily illustrate intra prediction modes including 33 directional prediction modes and two non-directional prediction modes.

Referring to FIGS. 4 and 5, an intra prediction mode having horizontal directionality and an intra prediction mode having vertical directionality may be classified with respect to a 18th intra prediction mode having a top-left diagonal prediction direction. The numbers of −32 to 32 in FIG. 4 represent the vertical or horizontal displacement of a unit of 1/32 on a sample grid position. Second to 17th intra prediction modes have horizontal directionality, and 18th to 34th intra prediction modes have vertical directionality. 10th intra prediction mode and 26th intra prediction mode represent a horizontal intra prediction mode and a vertical intra prediction mode, respectively and may express the prediction direction of the angular intra mode with respect to the 10th intra prediction mode and the 26th intra prediction mode as an angle. That is, a relative angle corresponding to each of the intra prediction modes may be expressed with respect to a horizontal reference angle 0° corresponding to the 10th intra prediction mode, and a relative angle corresponding to each of the intra prediction modes may be expressed with respect to a vertical reference angle 0° corresponding to the 26th intra prediction mode.

As another example, the intra prediction modes may include two non-directional (or non-angular) intra prediction modes and 65 directional (or angular) intra prediction modes as follows. The non-directional intra prediction modes may include a planar intra prediction mode which is a 0th non-directional intra prediction mode, and a DC intra prediction mode which is a first non-directional intra prediction mode, and the directional intra prediction modes may include 65 intra prediction modes which are second to 66th directional intra prediction modes. However, this is illustrative and the present disclosure may also be applied to a case where the number of intra prediction modes is different.

TABLE 2

| Intra prediction mode | Associated name |
| --- | --- |
| 0 | Intra planar |
| 1 | Intra DC |
| 2 . . . 66 | Intra angular 2 . . . intra angular 66 |

Figure 6:
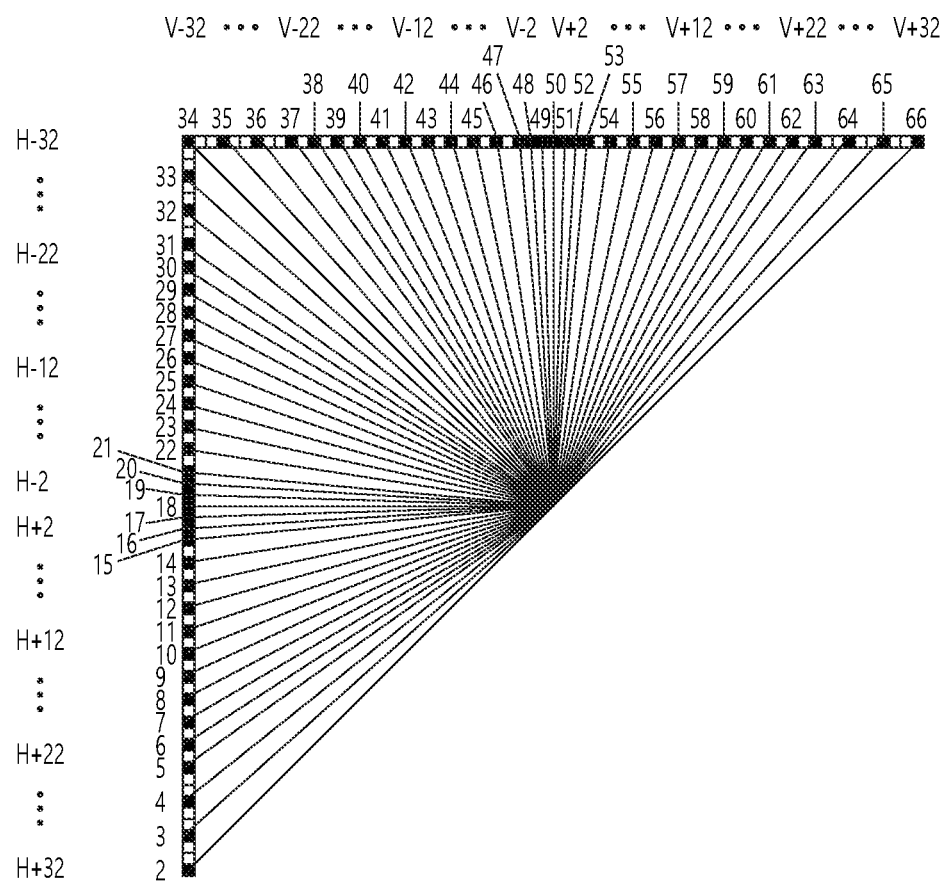
FIG. 6 exemplarily illustrates intra directional modes of 65 prediction directions.

FIG. 6 exemplarily illustrates intra directional modes of 65 prediction directions.

Referring to FIG. 6, an intra prediction mode having horizontal directionality and an intra prediction mode having vertical directionality may be classified with respect to a 34th intra prediction mode having a top-left diagonal prediction direction. In FIG. 3, H and V mean horizontal directionality and vertical directionality, respectively, and the numbers of −32 to 32 represent the displacement of a unit of 1/32 on the sample grid position. Second to 33th intra prediction modes have horizontal directionality, and 34th to 66th intra prediction modes have vertical directionality. 18th intra prediction mode and 50th intra prediction mode represent a horizontal intra prediction mode and a vertical intra prediction mode, respectively, and the second intra prediction mode may be called a bottom-left diagonal intra prediction mode, the 34th intra prediction mode may be called a top-left diagonal intra prediction mode, and the 66th intra prediction mode may be called a top-right diagonal intra prediction mode.

Meanwhile, if the intra prediction is applied to the current block, an intra prediction mode applied to the current block may be derived based on the intra prediction mode of the neighboring block of the current block. For example, the decoding apparatus may derive a most probable mode (MPM) list based on the intra prediction mode of the neighboring block (for example, left neighboring block and/or top neighboring block) of the current block and additional candidate modes, and select one of the MPM candidates within the derived MPM list based on a received MPM index, and alternatively, select one of the remaining intra prediction modes not included in the MPM candidates based on remaining intra prediction mode information. Whether the intra prediction mode of the current block exists within the MPM list may be indicated based on an MPM flag.

The MPM list may also be referred to as an intra prediction mode candidate list, and may also be expressed as candModeList.

Here, for example, the MPM list may include three MPM candidates or six MPM candidates. As an example, the MPM list may include candidates derived based on the intra prediction mode of the neighboring block, the derived intra prediction mode and/or a default intra prediction mode. The encoding apparatus/decoding apparatus may search for the neighboring blocks of the current block according to a specific order, and derive the intra prediction mode of the neighboring block as the MPM candidate in the derived order. For example, the neighboring blocks may include a left neighboring block, a top neighboring block, a bottom-left neighboring block, a top-right neighboring block, and a top-left neighboring block, and the encoding apparatus/decoding apparatus may search for the intra prediction mode of the left neighboring block, the intra prediction mode of the top neighboring block, the planar intra prediction mode, the DC intra prediction mode, the intra prediction mode of the bottom-left neighboring bock, the intra prediction mode of the top-right neighboring block, and the intra prediction mode of the top-left neighboring block in the order to derive an MPM candidate and configure the MPM list of the current block. Meanwhile, after searching, if six MPM candidates are not derived, the MPM candidate may be derived based on the intra prediction mode derived as the MPM candidate. For example, if the intra prediction mode derived as the MPM candidate is an Nth intra prediction mode, the encoding apparatus/decoding apparatus may derive the N+1th intra prediction mode and/or the N−1th intra prediction mode as the MPM candidate of the current block. A detailed description of the neighboring blocks will be made later.

In addition, for example, whether the intra prediction mode applied to the current block is included in the MPM candidates, or included in the remaining intra prediction modes may be derived based on the MPM flag. Specifically, if the value of the MPM flag is 1, the MPM flag may represent that the intra prediction mode of the current block is included in the MPM candidates (MPM list), and if the value of the MPM flag is 0, the MPM flag may represent that the intra prediction mode of the current block is not included in the MPM candidates (MPM list) and included in the residual intra prediction modes. Meanwhile, the MPM index may be signaled in a form of mpm_idx or intra_luma_mpm_idx syntax elements, and the remaining intra prediction mode information may be signaled in a form of rem_intra_luma_pred_mode or intra_luma_mpm_remainder syntax elements. In addition, the MPM flag may be signaled in a form of an intra_luma_mpm_flag syntax element, and if the MPM flag is not signaled, the value of the MPM flag may also be regarded as 1. In addition, as as example, the remaining intra prediction mode information may index the remaining intra prediction modes not included in the MPM candidates among all intra prediction modes in the order of the prediction mode number to indicate one among them. The intra prediction mode may be an intra prediction mode for a luma component (sample). Hereinafter, the intra prediction mode information may include at least one of the MPM flag, the MPM index, and the remaining intra prediction mode information. In addition, the MPM list may also be called various terms such as MPM candidate list and candModeList.

Meanwhile, the encoding apparatus may derive the MPM list of the current block based on the intra prediction mode of the neighboring block of the current block and the additional candidate modes, determine the intra prediction mode of the current block, and encode the intra prediction mode information of the current block to store and/or transmit the encoded intra prediction mode information.

Meanwhile, various intra prediction methods may be applied for the intra prediction. As an example, the prediction sample may also be generated through the interpolation between the second neighboring sample and the first neighboring sample located in the opposite direction of the prediction direction of the intra prediction mode of the current block with respect to the prediction sample of the current block among the neighboring reference samples. The aforementioned case may be called a linear interpolation intra prediction (LIP) or a linear interpolation prediction. As another example, the prediction sample may be derived using the reference sample located in the prediction direction in the corresponding line by selecting a reference sample line having the highest prediction accuracy among neighboring multi-reference sample lines of the current block and at this time, the intra prediction encoding may be performed in a method for indicating (signaling) the used reference sample line to the decoding apparatus. The aforementioned case may be called multi-reference line (MRL) intra prediction or MRL-based intra prediction. As still another example, the intra prediction is performed based on the same intra prediction mode by dividing the current block into the vertical or horizontal sub-partitions, and the neighboring reference samples may be derived and used in a unit of the sub-partition. That is, in this case, the intra prediction mode of the current block is equally applied to the sub-partitions, and the neighboring reference sample is derived and used in a unit of the sub-partition, thereby enhancing intra prediction performance in some cases. Such a prediction method may be called an intra sub-partitions (ISP) or an ISP-based intra prediction. The aforementioned intra prediction methods may be called an intra prediction type differently from the intra prediction mode. The intra prediction type may be called various terms such as an intra prediction technique or an additional intra prediction mode. For example, the intra prediction type (or additional intra prediction mode or the like) may include at least one of the aforementioned LIP, MRL intra prediction, or ISP intra prediction. A general intra prediction method other than specific intra prediction types such as the LIP, MRL intra prediction, and ISP intra prediction may be called a normal intra prediction type. The normal intra prediction type may be generally applied if the aforementioned specific intra prediction type is not applied, and if the normal intra prediction type is applied, the intra prediction may be performed using the aforementioned intra prediction mode and the reference sample line adjacent to the current block as illustrated in FIG. 3.

The aforementioned LIP, MRL intra prediction, and ISP intra prediction may be described in detail as follows.

Figure 7:
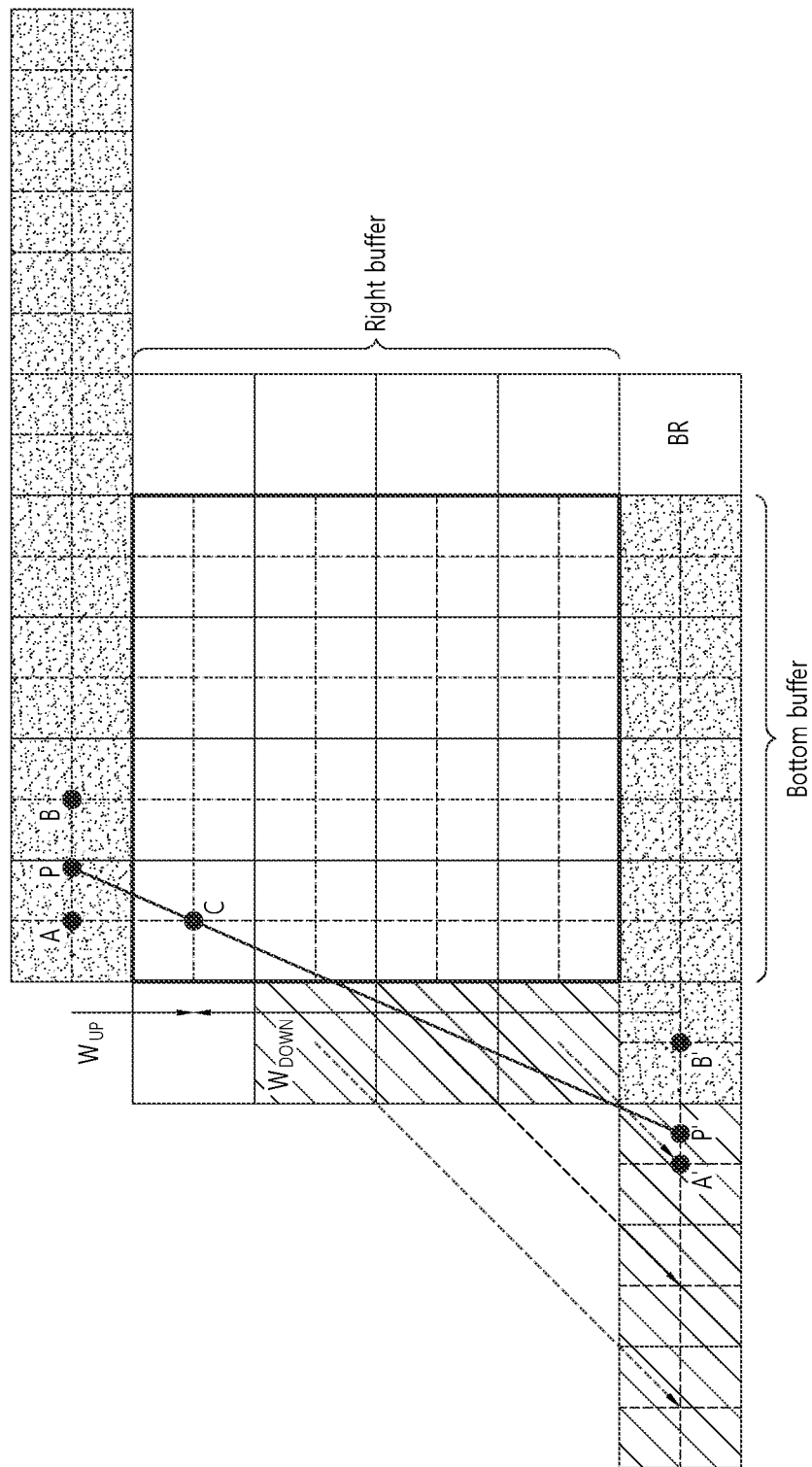
FIG. 7 exemplarily illustrates an LIP.

FIG. 7 exemplarily illustrates the LIP.

Generally, since the intra prediction simply copies the neighboring reference sample in order to derive the prediction sample, there is a tendency of increasing an error as a distance between the prediction sample and the reference sample is far away. The LIP may generate the prediction sample through the linear interpolation between the first neighboring reference sample located in the intra prediction direction and the second neighboring reference sample located in the opposite direction of the intra prediction direction in order to decrease the error generated in the intra prediction encoding. To this end, a right buffer and a bottom buffer may be additionally generated. The right buffer may include the right neighboring reference samples of the current block, and the bottom buffer may include the bottom neighboring reference samples of the current block. The right buffer or the bottom buffer may include the bottom-right neighboring reference sample of the current block. That is, the LIP may derive the right neighboring reference samples, the bottom-right neighboring reference sample, and the bottom neighboring reference samples of the current block, and then perform the linear interpolation with the conventional reference samples (the left neighboring reference samples, the top-left neighboring reference sample, and the top neighboring reference samples) to generate the prediction samples. Generally, since the blocks within the picture are encoded/decoded in a raster scan order, the right block, the bottom block, and the bottom-right block with respect to the current block to be currently decoded are not decoded, such that the right neighboring reference samples, the bottom-right neighboring reference samples, and the bottom neighboring reference samples of the current block have not been reconstructed, and the right neighboring reference samples, the bottom-right neighboring reference samples, and the bottom neighboring reference samples of the current block are required to be derived.

That is, in order to perform the LIP, first, the neighboring reference samples of the current block are required to be derived. In this case, the left neighboring reference samples, the top-left neighboring reference sample, and the top neighboring reference samples may use the reconstructed samples of the corresponding locations, and if there are some non-available samples, the corresponding non-available sample may be filled with an available sample through a substitution or padding procedure. In this case, for example, the non-available sample may be substituted or padded with another neighboring reference sample adjacent to the corresponding sample.

Meanwhile, since the right neighboring reference samples, the bottom-right neighboring reference sample, and the bottom neighboring reference samples 주변 among the reference samples are located in a block not decoded yet in the decoding order, the reconstructed sample may not exist at the corresponding location, and the present disclosure may derive the right neighboring reference samples, the bottom-right neighboring reference sample, and the bottom neighboring reference samples through various methods. As an example, the right neighboring reference samples, the bottom-right neighboring reference sample, and the bottom neighboring reference samples among the neighboring reference samples may be generated using the previously derived top neighboring reference samples and left neighboring reference samples. In this case, the bottom-right neighboring reference sample may be first derived based on at least one of the top neighboring reference samples and at least one of the left neighboring reference samples, and the bottom neighboring reference samples and the right neighboring reference samples may be derived using the derived bottom-right neighboring reference sample, the left neighboring reference sample, and the top neighboring reference sample. In this case, the bottom neighboring reference samples and the right neighboring reference samples may be derived through the linear interpolation according to the distance. Alternatively, values of the bottom neighboring reference samples and the right neighboring reference samples may also be derived by copying values of the corresponding left neighboring reference samples and top neighboring reference samples according to the locations of the bottom neighboring reference samples and the right neighboring reference samples.

Hereinafter, a method for generating the right neighboring reference samples, the bottom-right neighboring reference samples, and the bottom neighboring reference samples not reconstructed yet in the decoding order will be described. Although the present example is described based on a square block shape, the method according to the present example may be applied thereto equally/similarly in order to enhance intra prediction efficiency even if the current block has a non-square block shape. Hereinafter, the neighboring reference sample may be called a neighboring sample.

First, the bottom-right neighboring reference sample of the current block may be generated in the following method.

Figure 8:
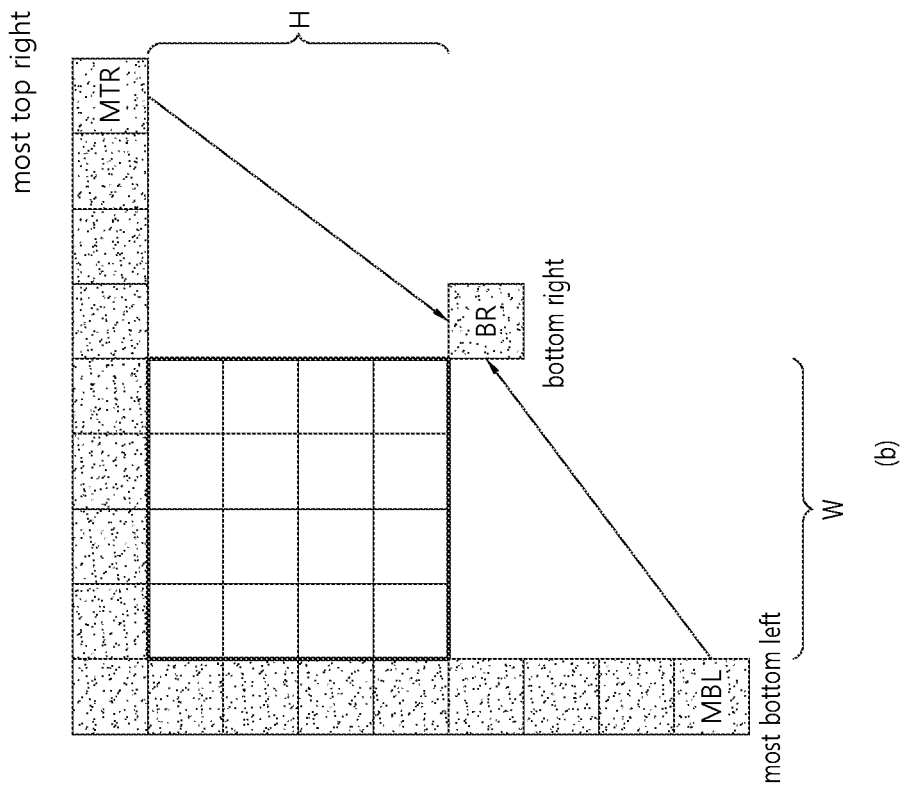
FIG. 8 illustrates an example of a method for generating a bottom-right neighboring sample of a current block.
Figure 8:
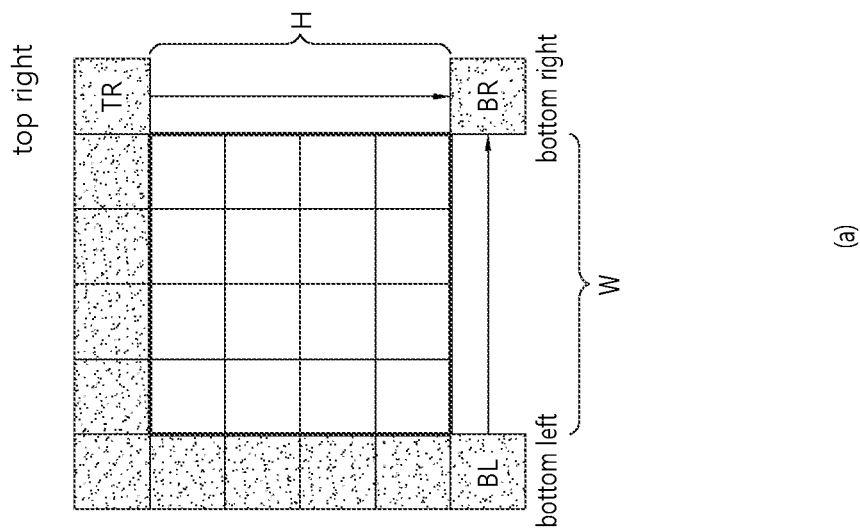

FIG. 8 illustrates an example of a method for generating a bottom-right neighboring sample of the current block.

Referring to (a) of FIG. 8, a bottom-right neighboring sample BR may be generated using a top-right neighboring sample TR located on the top-right corner of the current block, and a bottom-left neighboring sample BL located on the bottom-left corner of the current block. For example, when the top-left sample position of the current block is regarded as (0, 0), the top-right neighboring sample TR may be expressed as p[W][−1], the bottom-left neighboring sample BL may be expressed as p[−1][H], and the bottom-right neighboring sample BR may be expressed as p[W][H]. Here, the W and H correspond to the width and height of the current block, respectively.

Referring to (b) of FIG. 8, a bottom-right neighboring sample BR may be generated using a neighboring sample MTR located on the rightmost among the top neighboring samples of the current block and a neighboring sample MBL located on the lowermost among the left neighboring samples thereof. For example, the top neighboring samples and the left neighboring samples may have the number by the number of W+H, respectively, and when the top-left sample position of the current block is regarded as (0, 0), the neighboring sample MTR may be expressed as p[W+H][−1], the neighboring sample MBL may be expressed as p[−1][H+W], and the bottom-right neighboring sample BR may be expressed as p[W][H].

The bottom-right neighboring sample BR may also be derived based on an average value as in the following equations, and alternatively, derived based on a distance ratio.

$$BR=(TR+BL+1)>>1 \qquad \text{Equation 1}$$

$$BR=(MTR+MBL+1)>>1 \qquad \text{Equation 2}$$

$$BR=(W\cdot TR+H\cdot BL+((W+H)>>1))/(W+H) \qquad \text{Equation 3}$$

$$BR=(W\cdot MTR+H\cdot MBL+((W+H)>>1))/(W+H) \qquad \text{Equation 4}$$

Here, as described above, BR corresponds to the bottom-right neighboring sample, TR corresponds to the top-right neighboring sample located on the top-right corner of the current block, BL corresponds to the bottom-left neighboring sample located on the bottom-left corner of the current block, MTR corresponds to the neighboring sample located on the rightmost among the top neighboring samples of the current block, MBL corresponds to the neighboring sample located on the lowermost among the left neighboring samples, and W and H correspond to the width and height of the current block, respectively.

Meanwhile, the bottom neighboring samples and the right neighboring samples as well as the bottom-right neighboring sample of the current block are required to be generated for the LIP. If the blocks are coded in the raster scan order, in the coding time point of the current block, the bottom, bottom-right, and right block of the current block have not been coded yet. Therefore, the bottom neighboring samples and the right neighboring samples are required to be generated for the LIP. In this case, the bottom-right neighboring sample derived according to the aforementioned method may be used. Specifically, the bottom neighboring samples and right neighboring samples of the non-square current block may be generated using the derived bottom-right neighboring sample, and the previously decoded top neighboring sample and left neighboring sample.

Figure 9:
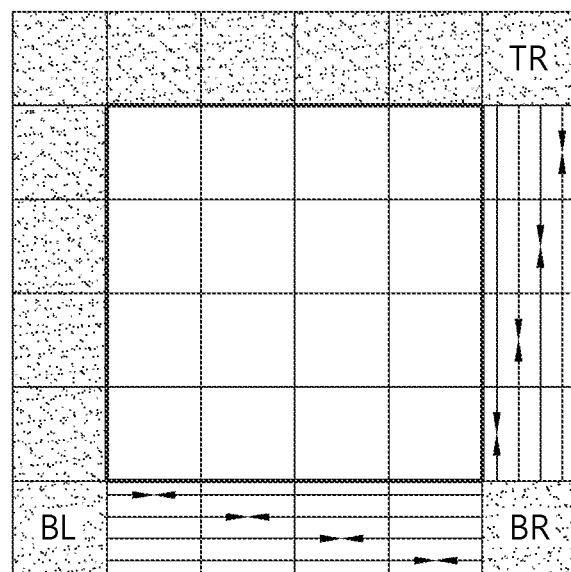
FIG. 9 illustrates an example of a method for generating bottom neighboring samples and right neighboring samples using the bottom-right neighboring sample.

FIG. 9 illustrates an example of a method for generating the bottom neighboring samples and the right neighboring samples using the bottom-right neighboring sample.

Referring to FIG. 9, the bottom neighboring samples may be generated by linearly interpolating the bottom-right neighboring sample BR of the current block and the bottom-left neighboring sample BL located on the bottom-left corner of the current block according to the distance. In addition, the right neighboring samples may be generated by linearly interpolating the bottom-right neighboring sample BR of the current block and the top-right neighboring sample TR located on the top-right corner of the current block according to the distance. For example, if the top-right neighboring sample TR is expressed as p[W][−1], the bottom-left neighboring sample BL is expressed as p[−1][H], and the bottom-right neighboring sample BR is expressed as p[W][H], the bottom neighboring samples may be expressed as p[0][H] . . . p[W−1][H], and the right neighboring samples may be expressed as p[W][0] . . . p[W][H−1]. In this case, for example, the bottom neighboring sample p[x][H] may be derived based on the interpolation according to the distances of the p[−1][H] and the p[W][H] for the corresponding sample location (x, H). In addition, for example, the right neighboring sample p[W][y] may be derived based on the interpolation according to the distance between the p[W][−1] and the p[W][H] for the corresponding sample location (W, y). Meanwhile, the bottom neighboring samples and the right neighboring samples may also be generated using the left neighboring samples and the top neighboring samples of the current block without using the bottom-right neighboring sample of the current block.

After generating the bottom neighboring samples and the right neighboring samples, the LIP may be performed using the generated bottom neighboring samples and right neighboring samples. As in FIG. 7 described above, the method for generating a current prediction sample C using the LIP may be performed as follows, for example. FIG. 7 illustrates a prediction mode as a vertical series of mode having positive directionality as an example.

1) Left neighboring samples are copied to the lower end sample buffer and a bottom buffer is generated using the generated bottom neighboring sample.

2) A prediction sample value P is generated by interpolating a reference sample A and a reference sample B of the top reference buffer using a reconstructed value.

3) A prediction sample P' is generated by interpolating a reference sample A' and a reference sample B' of the bottom reference buffer newly generated.

4) A final prediction value C is generated by linearly interpolating the generated P and P'.

$$C=(w_{UP}*P+w_{DOWN}*P'+(w_{UP}+w_{DOWN})/2)/(w_{UP}+w_{DOWN})$$ Equation 5

A prediction sample value may be generated by applying the methods 2) to 4) to all samples within the current block. The LIP method may be applied to all directionality modes other than a planar mode and a DC mode whose directionality do not exist.

Meanwhile, the MRL intra prediction may be performed as follows.

The conventional intra prediction uses only the neighboring samples of the first top line and the neighboring samples of the first left line of the current block as the reference samples for the intra prediction. However, the Multiple-reference line (MRL) method may perform the intra prediction using the neighboring samples located in the sample line separated by one or three sample distances with respect to the top and/or left of the current block as the reference samples.

Figure 10:
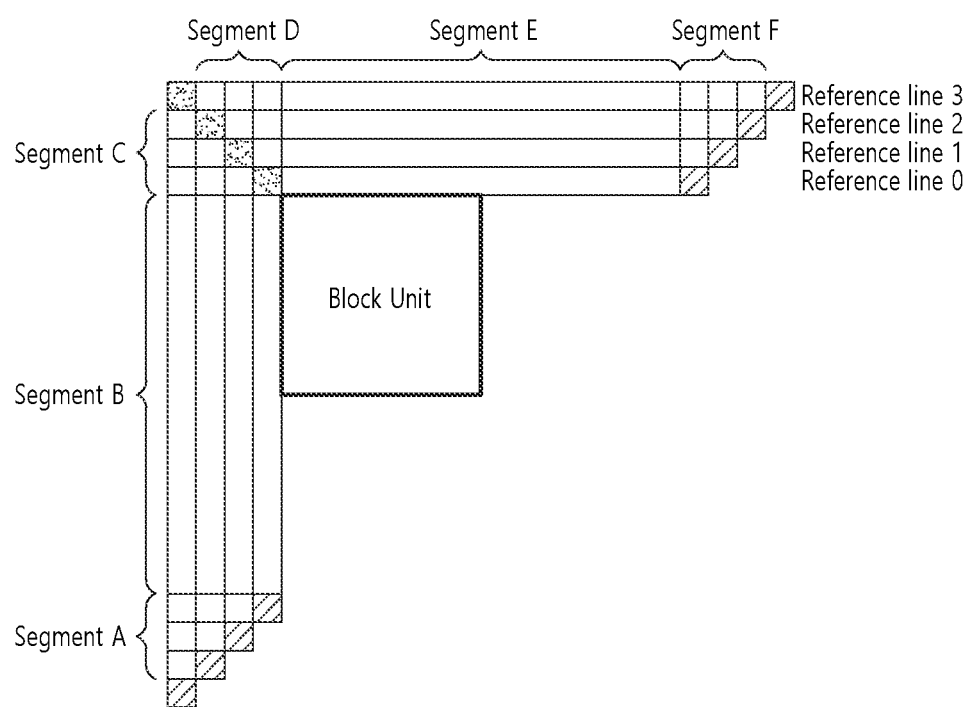
FIG. 10 illustrates an example of the MRL.

FIG. 10 illustrates an example of the MRL, and here, a multi-reference line index represents whether any line is used for the intra prediction with respect to the current block. The multi-reference line index may be called an MRL index, and configured in a form of an intra_luma_ref_idx syntax element. If a value of the multi-reference line index is 0, it may be indicated that only the neighboring reference samples of the conventional first line are used as the reference samples for the intra prediction, and the values of the multi-reference line index larger than 0 may indicate that the neighboring reference samples of the lines other than the conventional first line are used as the reference samples for the intra prediction. For example, the multi-reference line index may indicate the following intra reference sample line.

TABLE 3

| Intra_luma_ref_idx[x0][y0] | IntraLumaRefLineIdx[x0][y0] |
|---|---|
| 0 | 0 |
| 1 | 1 |
| 2 | 3 |

That is, if the MRL intra prediction is applied to the current block, the intra prediction may be performed (derivation of the predicted block) based on the intra prediction mode of the current block and the neighboring reference samples of the neighboring reference sample line indicated by the value of the MRL index.

Meanwhile, the ISP intra prediction may be performed as follows.

The normal intra prediction performs prediction without split by regarding the block to be currently coded as one processing unit. However, the ISP intra prediction method performs the intra prediction by splitting the block to be currently coded horizontally or vertically. At this time, the reconstructed block is generated by performing the encoding/decoding in a unit of the split block and (the reconstructed samples of) the reconstructed block is used as the reference block (reference samples) of the block to be next split.

Figure 11:
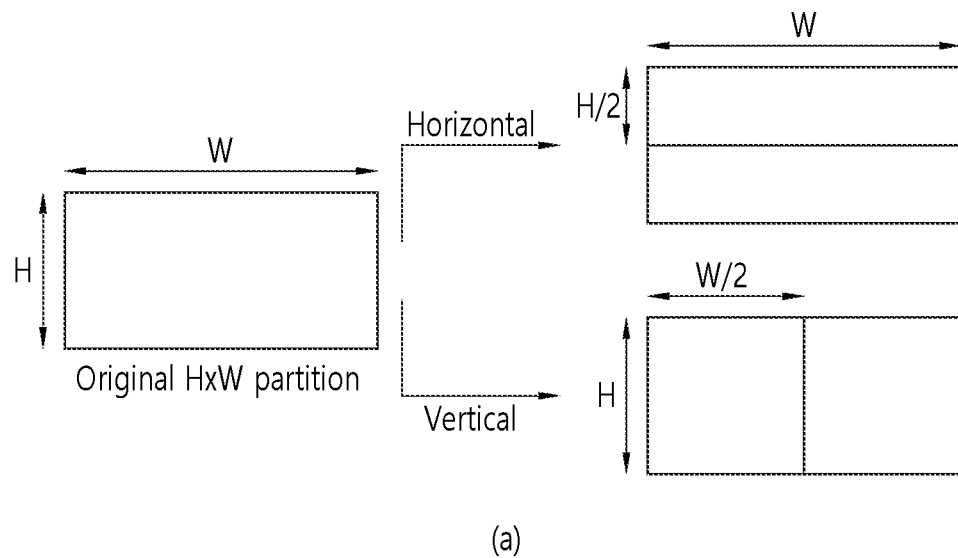
FIG. 11 illustrates an example of the split according to the size of the current block (for example, CU/CB).
Figure 11:
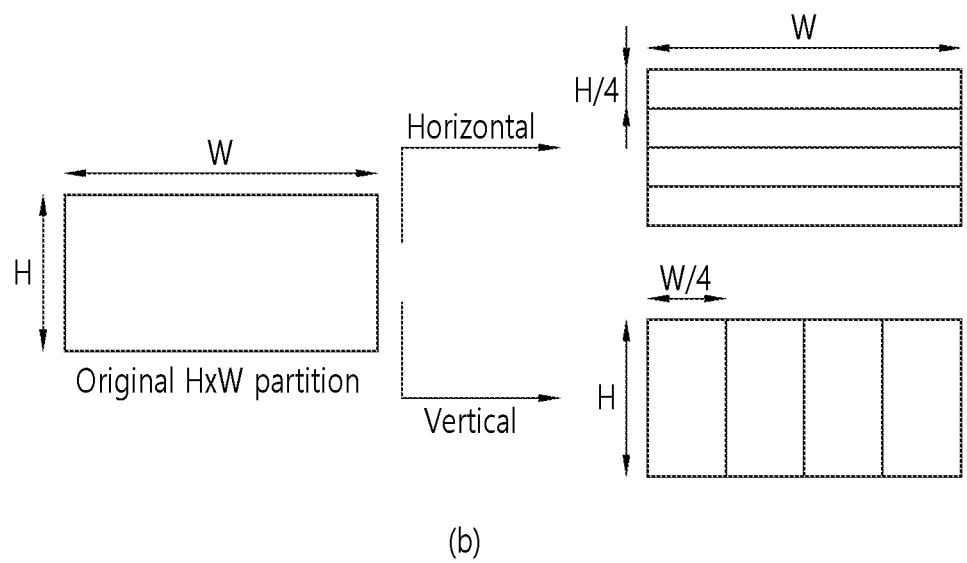

Table 4 and FIG. 11 illustrate an example of the split according to the size of the current block (for example, CU/CB).

TABLE 4

| Block size (CU) | The number of splits |
|---|---|
| 4 × 4 | No split |
| 4 × 8, 8 × 4 | 2 |
| All different cases | 4 |

If the ISP intra prediction type is applied, an optimal mode may be generated by generating an MPM list according to the respective split methods (horizontal split and vertical split) in order to decrease coding complexity and comparing a suitable prediction mode among the prediction modes within the generated MPM list in view of rate distortion optimization (RDO). In addition, if the intra prediction of the aforementioned multi-reference line (MRL) is used, the aforementioned intra sub-partition method may be limited not to be used. That is, in this case, the intra sub-partition method may be applied only in the case of using the first line (0th) reference line (that is, a value of intra_luma_ref_idx is 0).

The ISP intra prediction method first transmits whether to apply the intra sub-partition in a unit of block and if the current block uses the intra sub-partition (intra_subpartitions_mode_flag), information (intra_subpartitions_split_flag) about whether it is horizontal split or vertical split may be signaled.

If the ISP intra prediction method is applied, the intra prediction mode of the current block is equally applied to the sub-partitions, and the neighboring reference sample may be derived in a unit of the sub-partition and used, thereby enhancing intra prediction performance. That is, if the intra sub-partition method is applied, a residual sample processing procedure is performed in a unit of sub-partition. That is, the intra prediction samples are derived for the respective sub-partitions, and a residual signal (residual samples) for the corresponding sub-partition is added to the intra prediction samples, such that the reconstructed samples are acquired. The residual signal (residual samples) may be derived through dequantization/inverse transform, or the like based on residual information (quantized transform coefficient information or residual coding syntax) within the aforementioned bit stream. That is, the prediction samples and the residual samples for a first sub-partition may be derived, and the reconstructed samples for the first sub-partition may be derived based on the derived prediction samples and residual samples. In this case, when the prediction samples for a second sub-partition are derived, some (for example, the left or top neighboring reference samples of the second sub-partition) of the reconstructed samples within the first sub-partition may be used as the neighboring reference samples for the second sub-partition. Likewise, the prediction samples and the residual samples may be derived for the second sub-partition, and the reconstructed samples for the second sub-partition may be derived based on the derived prediction samples and residual samples. In this case, when the prediction samples for a third sub-partition are derived, some (for example, the left or top neighboring reference samples of the third sub-partition) of the reconstructed samples within the second sub-partition may be used as the neighboring reference samples for the third sub-partition. The following is the same.

Meanwhile, a number of intra prediction modes are currently considered for enhancing intra prediction performance, and the content in which the encoding apparatus sequentially performs the intra prediction for all intra prediction modes to determine the optimal intra prediction mode based on the rate-distortion optimization (RDO) is not preferable in terms of computational complexity or a load. Therefore, in consideration of such a point, the optimal intra prediction mode may be, for example, determined as follows.

Figure 12:
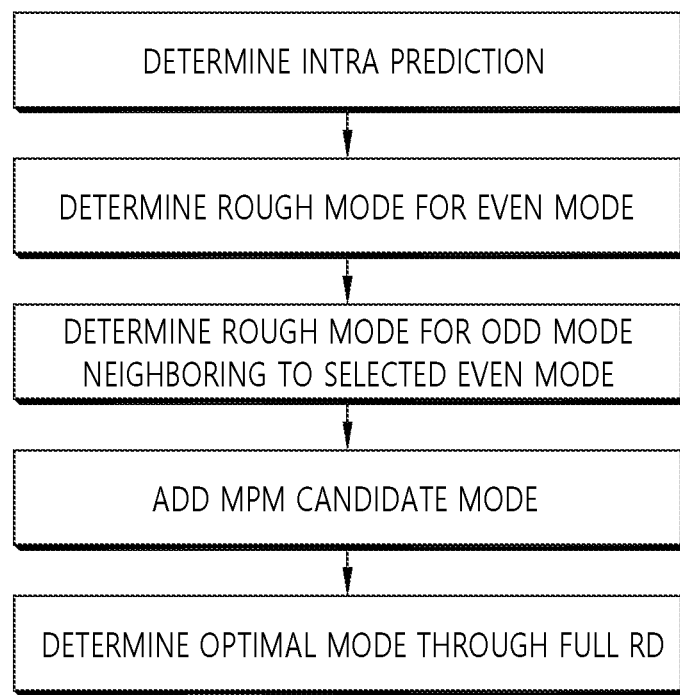
FIG. 12 illustrates an example of a method for determining an intra prediction mode in the encoding apparatus.

FIG. 12 illustrates an example of a method for determining the intra prediction mode in the encoding apparatus.

Referring to FIG. 12, if the intra prediction is applied to the current block, a candidate even-numbered mode is first determined. For example, the candidate even-numbered mode for full rate-distortion (RD) may be determined through a rough mode decision method for the even-numbered mode. At this time, the rough mode decision method determines a cost value based on a difference between a prediction block and an original block and a bit necessary for simply encoding mode information and determines a mode with a small cost value as a candidate mode. Next, the rough mode decision method re-determines a candidate mode for the full RD for odd-numbered modes obtained by adding and subtracting 1 to and from the determined even-numbered mode (for example, if the selected even-numbered mode is 20, the odd-numbered modes obtained by adding and subtracting 1 to and from the even-numbered mode are a 19th mode and a 21th mode) through the rough mode decision method. After determining the candidate mode through the rough mode determination, the rough mode decision method searches for a similar mode neighboring to the current block (that is, the intra prediction mode of the neighboring block) using the most probable mode (MPM) method and adds the similar mode to the candidate mode. Lastly, the rough mode decision method may determine an optimal intra prediction mode through the full RD in view of the rate-distortion optimization (RDO).

In addition, the exemplary embodiment of the present disclosure may determine the optimal intra prediction mode in consideration of the aforementioned specific intra prediction type (for example, LIP, MRL, and/or ISP) and efficiently signal the optimal intra prediction mode to the decoding apparatus.

Figure 13:
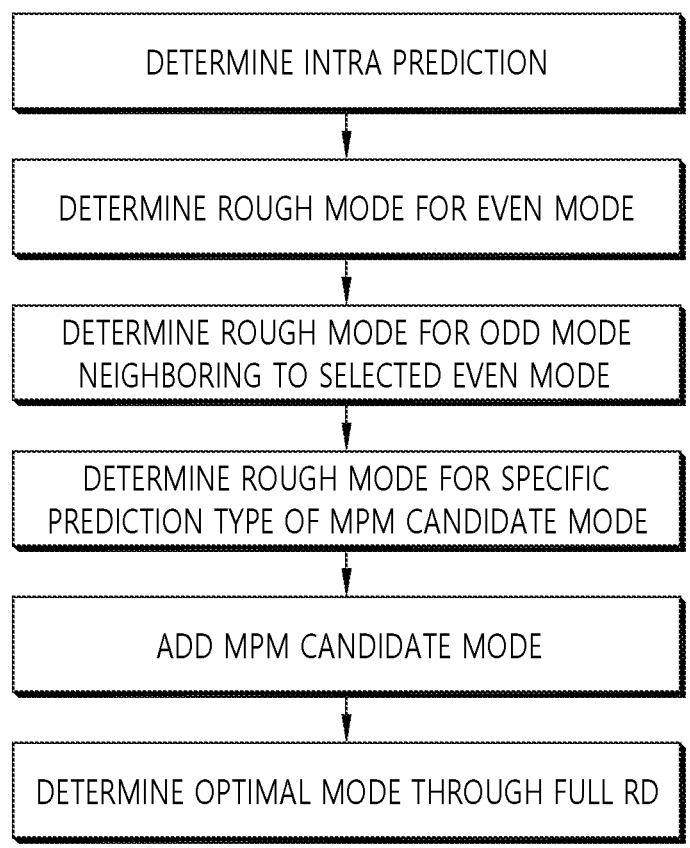
FIG. 13 illustrates an example of the method for determining an optimal intra prediction mode considering an intra prediction type.

FIG. 13 illustrates an example of a method for determining the optimal intra prediction mode considering the intra prediction type.

Referring to FIG. 13, the rough mode decision (RMD) method for the specific intra prediction type (for example, LIP, MRL, and/or ISP) of the MPM candidate mode, which is a fourth stage, is added to the method for determining the optimal intra prediction mode according to the present exemplary embodiment compared to the method for determining the intra prediction mode illustrated in FIG. 12.

For example, if the intra prediction is applied to the current block, a candidate even-numbered mode is first determined. For example, the candidate even-numbered mode for the full rate-distortion (RD) may be determined through the rough mode decision method for the even-numbered modes. Next, the rough mode decision method re-determines a candidate mode for the full RD for odd-numbered modes adding and subtracting 1 to and from the determined even-numbered mode (for example, if the selected even-numbered mode is 20, the odd-numbered modes adding and subtracting 1 to and from the even-numbered mode are a 19th mode and a 21th mode) through the rough mode decision method again. After determining the candidate mode for the full RD using the conventional prediction encoding method within the screen, the rough mode decision method performs the rough mode determination for the specific prediction type. The rough mode decision method for the specific prediction type determines the candidate mode to be used for determining an approximate mode using the MPM method.

Figure 14:
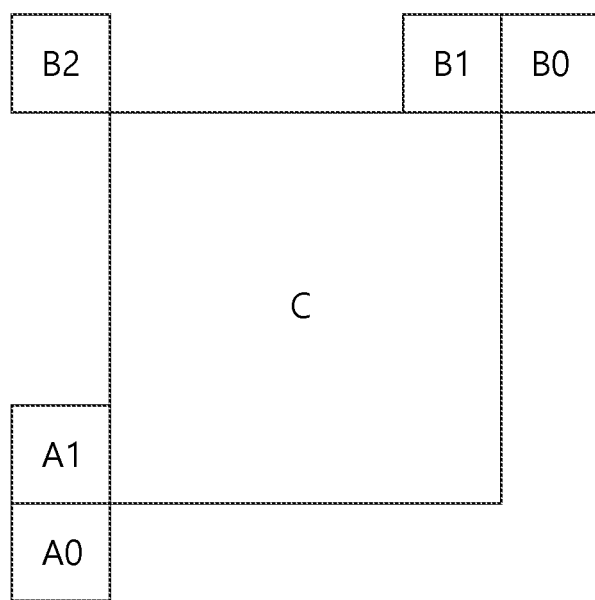
FIG. 14 exemplarity illustrates neighboring blocks referenced in the case of determining a candidate mode using an MPM method.

FIG. 14 exemplarily illustrates neighboring blocks referred in the case of determining the candidate mode using the MPM method.

As illustrated in FIG. 14, C represents a block to be currently coded. A0, A1, B0, B1, B2 represent the neighboring block of the current block C. An intra prediction mode neighboring to the current block is derived while the neighboring blocks are searched in the order of A1, B1, A0, B0, B2. At this time, the location of the neighboring block to be searched and the searching order of the neighboring blocks may also be determined in advance or determined arbitrarily. If the planar mode and the DC mode are limited not to be used for the LIP, MRL, and/or ISP predictions, the intra prediction mode of the neighboring block is not registered as the candidate mode for the full RD in the case of the planar mode or the DC mode. After the candidate mode for the full RD is searched while the neighboring blocks are searched, the modes adding and subtracting 1 to and from the respective selected candidate modes are again added as the candidate modes. At this time, when the number of candidate modes is 6, the method for determining the MPM candidate mode is terminated. The derived candidate modes are added to the MPM list. If the number of candidate modes is not 6 even if all the modes adding and subtracting 1 to and from the selected candidate mode are added to the MPM list, a default mode defined below is duplicate-confirmed and sequentially registered as the candidate mode. At this time, the candidate of the default mode and the order of the default mode may be all determined arbitrarily. Since the method for determining the MPM candidate mode goes through a duplicate mode confirmation process in all processes, the generated MPM candidate mode is generated as a unique mode. The candidate of the default mode may be, for example, configured as follows.

Default mode={VER_IDX,HOR_IDX,2,(VER_IDX−1),VDIA_IDX,DIA_IDX}

Among the candidates of the default mode, the VER_IDX represents a vertical mode, the HOR_IDX represents a horizontal mode, a second mode represents a bottom-left diagonal mode, the VER_DIX−1 represents (the vertical mode number−1) mode, the VDIA_IDX represents a top-right diagonal mode, and the DIA_IDX represents a top-left diagonal mode, respectively.

In addition, the aforementioned method proposed in the method for generating the MPM candidate mode uses six MPM candidate modes, but the number of MPM candidate modes may generate the MPM candidate modes using any number such as 4, 5, or 7. At this time, the MPM index may perform encoding/decoding using a truncated unary (TU) sign, and when a fewer number of MPM candidate modes than the conventional six MPM candidate modes are used, it is possible to save an encoding bit when encoding the last MPM index. Therefore, if the frequency of occurrence of the last MPM candidate is low, it is efficient to save the MPM index encoding bit by decreasing the number of MPM candidate modes. Therefore, the number of MPM candidate modes may be flexibly adjusted.

After the rough mode decision mode for the specific prediction type applied to the current block is applied to the thus selected MPM candidate mode, the rough mode decision method for the intra prediction re-determines the candidate mode to be used for the full RD by comparing the previous-determined mode and the cost value.

FIG. 15 illustrates a method for determining the candidate mode to be used for another full RD in one example of the present disclosure. In FIG. 15, the number of N and M may be determined in advance or determined arbitrarily. In the present exemplary embodiment, a value of the N is exemplarily determined as 3 and a value of the M is exemplarily determined as 2.

FIG. 15 illustrates that the method is classified into two processes (the rough mode decision (RMD) process and the full RD process). First, the method for determining an approximate mode for the even-numbered mode determines N candidate modes. Next, the method for determining the approximate mode for the odd-numbered modes adding and subtracting 1 to and from the determined N even candidate modes determines updated N candidate modes. At this time, the even-numbered mode and the odd-numbered mode may coexist in the N candidate modes. Next, the method for determining the approximate mode determines updated N candidate modes again with respect to six candidate modes generated through the process for generating the MPM in consideration of the specific prediction type. At this time, the intra prediction mode for the specific prediction type as well as the normal intra prediction mode may also exist together as the candidate mode. General M modes generated through the process of generating the final MPM are added to the candidate mode for the full RD. Therefore, the final number of candidate modes for the full RD may be from the minimum N to the maximum N+M. At this time, the reason why the number of modes is different is because the duplicated mode is not added through the duplicate confirmation process. The full RD process may be performed for the finally selected candidate mode in view of the rate-distortion optimization and the optimal intra prediction mode may be determined.

The predicted block may be generated by performing the intra prediction coding using the thus determined mode. If the currently selected optimal mode is an intra prediction mode for the normal prediction type, the predicted block is generated by performing the normal intra prediction encoding and otherwise, if the currently selected optimal mode is the intra prediction mode for the specific prediction type, the predicted block is generated by performing the aforementioned intra prediction coding based on the corresponding specific prediction type. After the predicted block is generated using a suitable method according to the optimal mode of the current block, a residual signal (residual block or residual samples) may be derived by comparing the original block with the generated predicted block, and residual information may be generated by performing the transform and the quantization process for the residual signal, as described above. Thereafter, the encoding apparatus may encode information about the intra prediction type of the current block, information about the intra prediction mode, and image information including the residual information to output the encoded information in a bitstream form. The bitstream may be stored in a digital storage medium in a form such as a file or transmitted to the decoding apparatus through a network.

Meanwhile, according to the aforementioned exemplary embodiment, the specific intra prediction type (for example, LIP, MRL, ISP) may be limitedly applied to only the candidate modes generated in the MPM list. That is, if the specific intra prediction type is applied, one of the candidate modes within the MPM list may be limited to be used for the current block, and in this case, the information about the intra prediction mode may omit the MPM index, thereby decreasing the bit to be signaled. Considering that one picture is split into a considerable number of blocks and coded, the decrease in the number of bits may enhance the overall coding efficiency.

Figure 16:
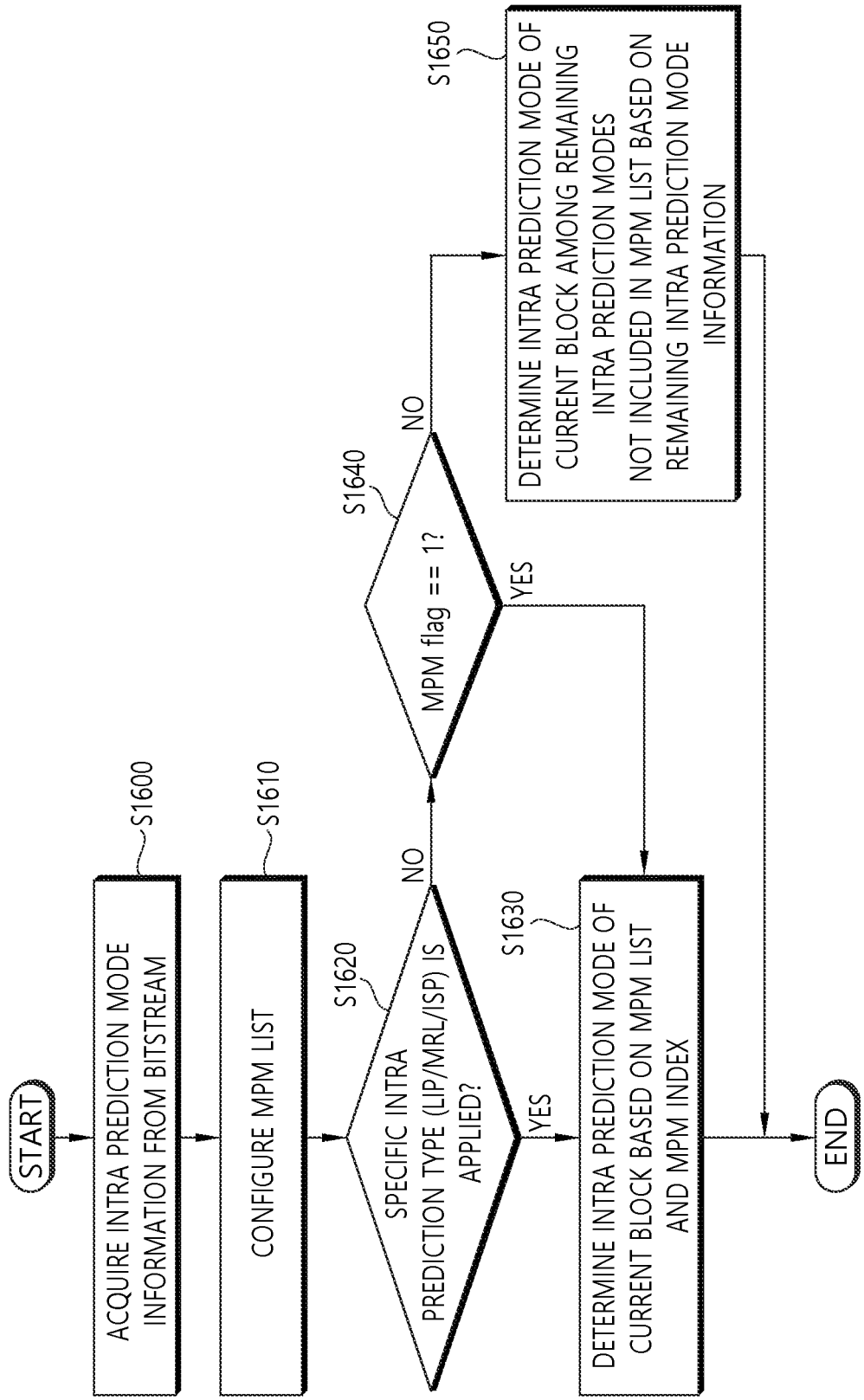
FIG. 16 illustrates a method for signaling an intra prediction mode according to an exemplary embodiment of the present disclosure.

FIG. 16 illustrates a method for signaling the intra prediction mode according to the exemplary embodiment of the present disclosure.

Referring to FIG. 16, the decoding apparatus acquires intra prediction mode information from the bitstream (S1600). As described above, the intra prediction mode information may include at least one of the MPM flag, the MPM index, and the remaining intra prediction mode information.

The decoding apparatus configures the MPM list (S1610). The MPM list is configured to be the same as the MPM list configured in the encoding apparatus. That is, the MPM list may also include the intra prediction mode of the neighboring block, and may further include specific intra prediction modes derived according to the aforementioned method. The MPM list may also be configured differently according to the intra prediction type, or the MPM list may also be configured regardless of the intra prediction type of the current block.

Although it has been described that the S1610 is performed after the S1600, this is illustrative, and the S1610 may also be performed before the S1600 and may also be performed simultaneously.

The decoding apparatus may determine the intra prediction mode of the current block based on the MPM list and the intra prediction mode information.

The decoding apparatus determines whether the specific intra prediction type is applied to the current block (S1620). The specific intra prediction type may include the aforementioned LIP type, MRL intra prediction type, and/or ISP prediction type. For example, the decoding apparatus may acquire information about the intra prediction type from the bitstream.

If the specific intra prediction type is applied, the decoding apparatus may determine that the intra prediction mode of the current block exists in the MPM list. In this case, the decoding apparatus parses and decodes the MPM index without parsing the MPM flag to derive the candidate intra prediction mode within the MPM list indicated by the MPM index as the intra prediction mode of the current block (S1630). That is, in this case, the information about the intra prediction mode of the current block does not include the MPM flag. In this case, the decoding apparatus may estimate or consider that the value of the MPM flag is 1 even without parsing the MPM flag, and as described above, the encoding apparatus may not encode the value of the MPM flag upon the intra prediction encoding.

Meanwhile, if the specific intra prediction type is not applied, that is, if the normal intra prediction is applied, the information about the intra prediction mode includes the MPM flag, and in this case, the decoding apparatus confirms whether the value of the MPM flag is 1 (S1640).

If the value of the MPM flag is 1, the decoding apparatus may derive the candidate intra prediction mode within the MPM list indicated by the MPM index as the intra prediction mode of the current block.

Meanwhile, if the value of the MPM flag is 0, the decoding apparatus may derive the intra prediction mode of the current block among the remaining intra prediction modes not included in the MPM list based on the remaining intra prediction mode information included in the information about the intra prediction mode (S1650).

As described above, the predicted block may be generated based on the derived intra prediction mode, and the reconstructed block/picture may be generated based on the predicted block.

Meanwhile, an intra prediction mode derivation and intra prediction procedure according to the respective prediction types may be specifically performed, for example, as follows.

Figure 17:
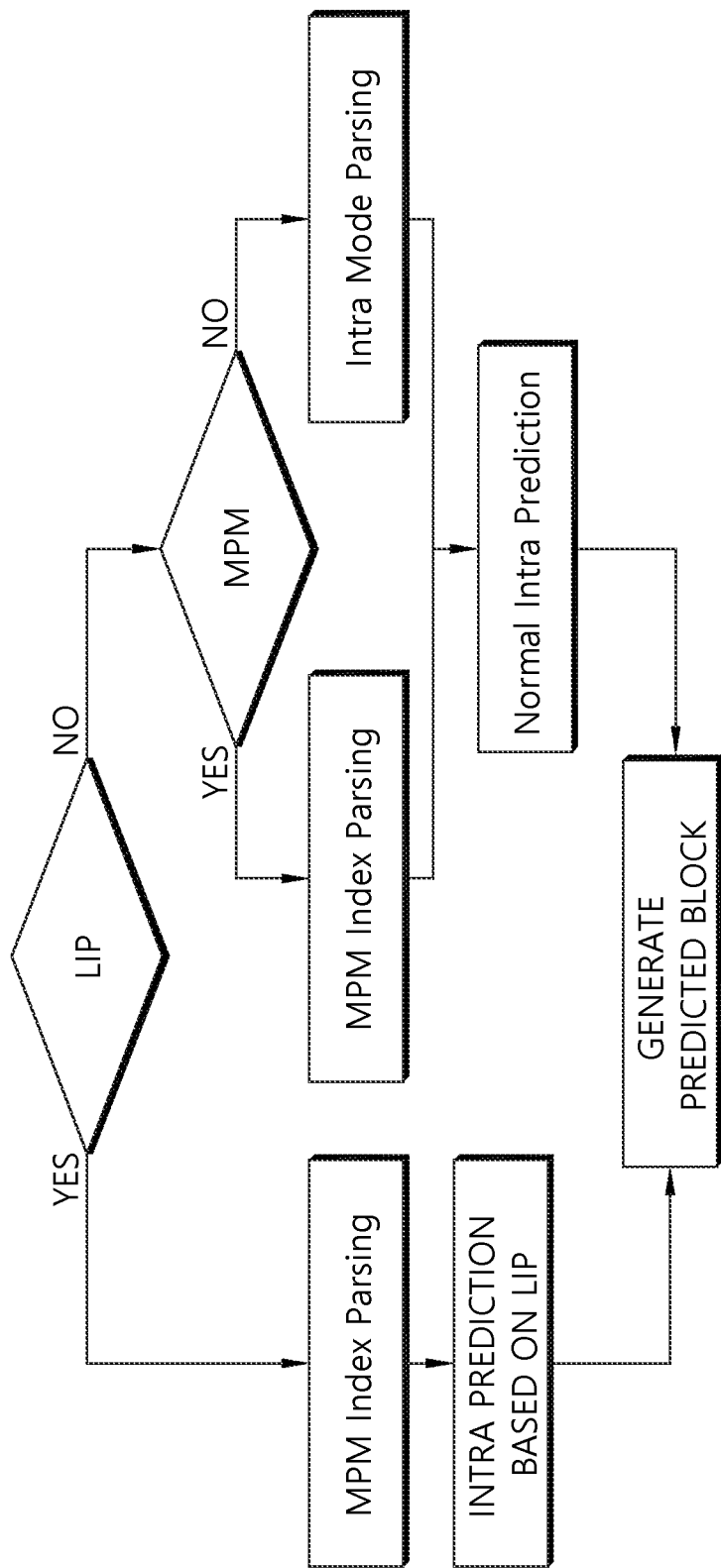
FIG. 17 exemplarily illustrates an intra prediction mode derivation and intra prediction procedure based on an LIP type.

FIG. 17 exemplarily illustrates the intra prediction mode derivation and intra prediction procedure based on the LIP type.

Referring to FIG. 17, the decoding apparatus determines whether the LIP is applied to the current block. For example, the decoding apparatus may acquire an LIP flag from the bitstream, and if a value of the LIP flag is 1, the LIP may determine that the LIP is applied to the current block.

If the LIP is applied to the current block, the decoding apparatus may parse the MPM index from the bitstream to derive the intra prediction mode for the LIP from the MPM list. In this case, the decoding apparatus may parse the MPM index directly without parsing the MPM flag. The decoding apparatus may perform the intra prediction based on the LIP type and the intra prediction mode to generate the predicted block.

Meanwhile, if the LIP is not applied to the current block, the decoding apparatus may parse the MPM flag to the bitstream, and if the value of the MPM flag is 1, the decoding apparatus may parse the MPM index to derive the intra prediction mode for the normal intra prediction. Meanwhile, if the value of the MPM flag is 0, the decoding apparatus may parse the remaining intra mode information from the bitstream, and derive the intra prediction mode of the current block among the intra prediction modes other than the candidate intra prediction modes included in the MPM list based on the remaining intra mode information.

The decoding apparatus may perform the intra prediction based on the intra prediction mode to generate the predicted block.

The following represents the performance and complexity of the LIP according to the exemplary embodiment of the present disclosure. Table 5 expresses the performance and complexity in All intra environments, and Table 6 expresses the performance and complexity in a random access (RA) environment.

TABLE 5

| | BD-rate (piecewise cubic) | | | Complexity | |
|---|---|---|---|---|---|
| | Y | U | V | Enc. | Dec. |
| SDR-UHD1 4K | −1.10% | −0.74% | −1.02% | | |
| SDR-HD1 1080p | −0.86% | −1.14% | −0.80% | | |
| All | −0.98% | −0.94% | −0.91% | 107.4% | 101.4% |

TABLE 6

| | BD-rate (piecewise cubic) | | | Complexity | |
|---|---|---|---|---|---|
| | Y | U | V | Enc. | Dec. |
| SDR-UHD1 4K | −0.66% | −0.68% | −0.99% | | |
| SDR-HD1 1080p | −0.47% | −0.61% | −0.89% | | |
| All | −0.57% | −0.64% | −0.94% | 101.0% | 101.1% |

As expressed in Tables 5 and 6, the exemplary embodiment of the present disclosure may improve coding efficiency almost without increasing complexity.

Figure 18:
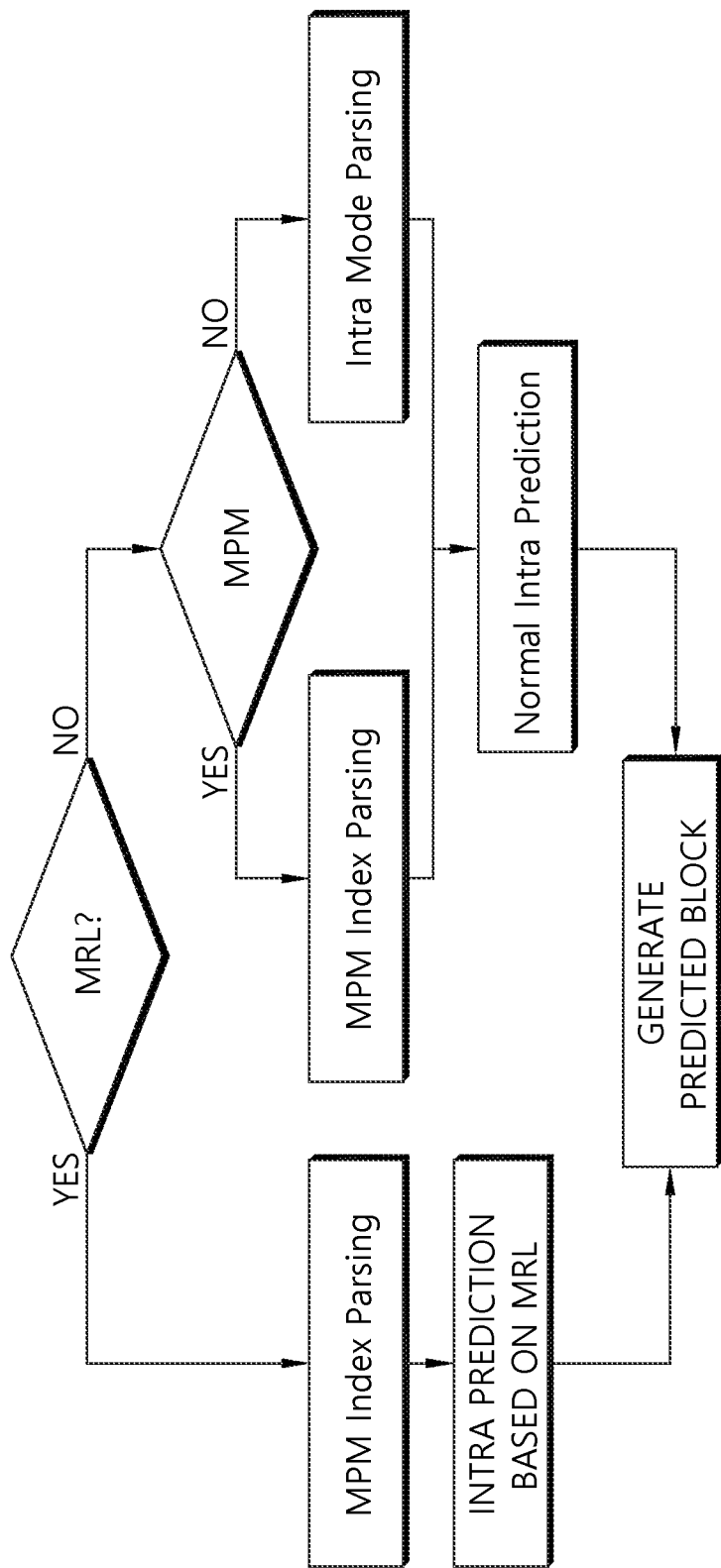
FIG. 18 exemplarily illustrates an intra prediction mode derivation and intra prediction procedure based on an MRL intra prediction type.

FIG. 18 exemplarily illustrates the intra prediction mode derivation and intra prediction procedure based on the MRL intra prediction type.

Referring to FIG. 18, the decoding apparatus determines whether the MRL intra prediction is applied to the current block. For example, the decoding apparatus may acquire a multi-reference line index (for example, intra_luma_ref_idx) from the bitstream, and determine that the MRL intra prediction is applied if a value of the multi-reference line index is larger than 0. Meanwhile, if the value of the multi-reference line index is 0, the decoding apparatus may determine that the normal intra prediction is applied.

If the MRL intra prediction is applied to the current block, the decoding apparatus may parse the MPM index from the bitstream to derive the intra prediction mode for the MRL intra prediction from the MRL list. In this case, the decoding apparatus may parse the MPM index directly without parsing the MPM flag. The decoding apparatus may perform the intra prediction based on the MRL intra prediction type and the intra prediction mode to generate a predicted block.

Meanwhile, if the MRL intra prediction is not applied to the current block, the decoding apparatus may parse the MPM flag to the bitstream, and parse the MPM index to derive the intra prediction mode for the normal intra prediction if the value of the MPM flag is 1. Meanwhile, if the value of the MPM flag is 0, the decoding apparatus may parse remaining intra mode information from the bitstream, and derive the intra prediction mode of the current block among the intra prediction modes other than the candidate intra prediction modes included in the MPM list based on the remaining intra prediction mode information.

The decoding apparatus may perform the intra prediction based on the intra prediction mode to generate a predicted block.

Figure 19:
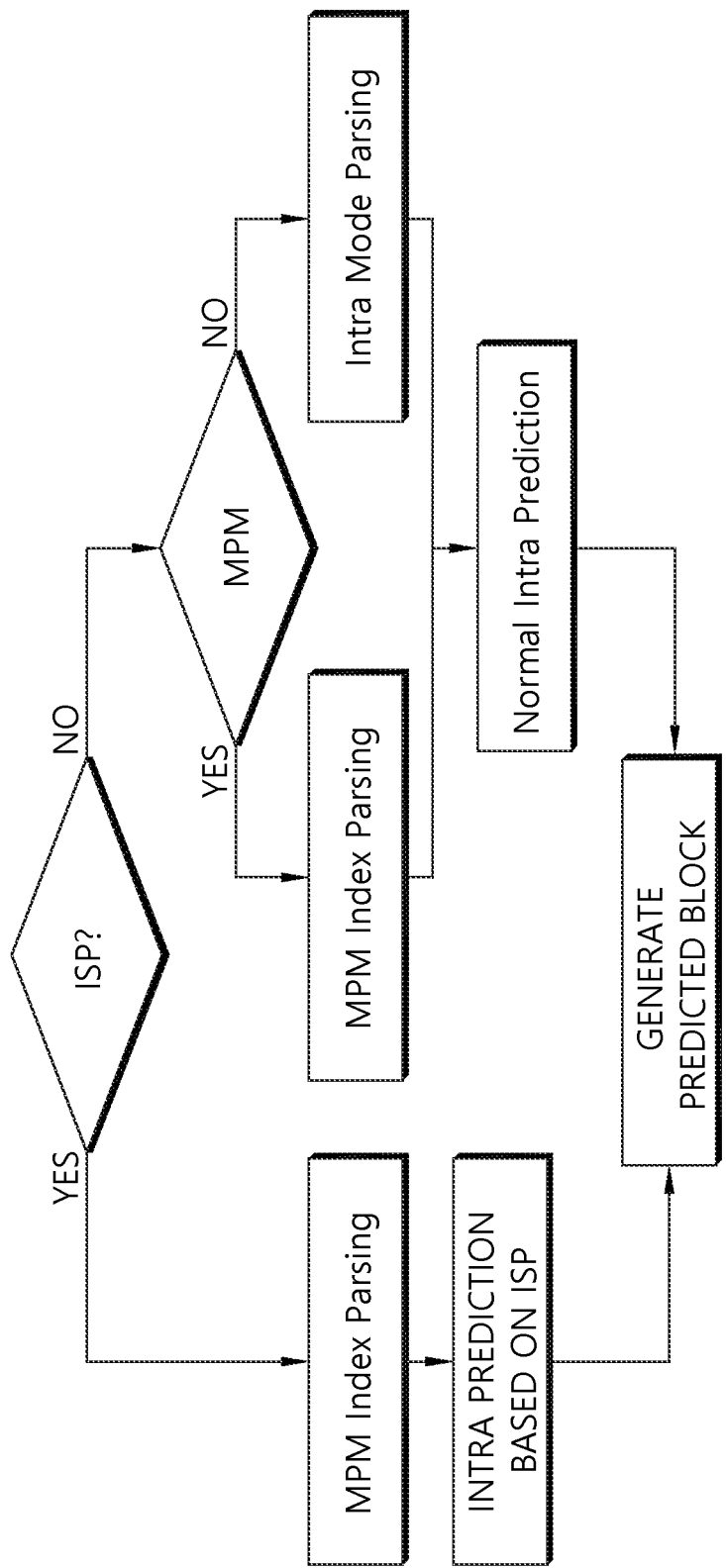
FIG. 19 exemplarily illustrates an intra prediction mode derivation and intra prediction procedure based on an ISP intra prediction type.

FIG. 19 exemplarily illustrates the intra prediction mode derivation and intra prediction procedure based on the ISP intra prediction type.

Referring to FIG. 19, the decoding apparatus determines whether the ISP intra-prediction is applied to the current block. For example, the decoding apparatus may acquire an ISP flag from the bitstream, and determine that the ISP intra prediction is applied if a value of the ISP flag is 1. Meanwhile, if the value of the ISP flag is 0, the decoding apparatus may determine that the ISP intra prediction is not applied.

If the ISP intra prediction is applied to the current block, the decoding apparatus may parse the MPM index from the bitstream to derive the intra prediction mode for the ISP intra prediction from the MPM list. In this case, the decoding apparatus may parse the MPM index directly without parsing the MPM flag. The decoding apparatus may perform the intra prediction based on the MRL intra prediction type and the intra prediction mode to generate a predicted block.

Meanwhile, if the ISP intra prediction is not applied to the current block, the decoding apparatus may parse the MPM flag to the bitstream, and parse the MPM index to derive the intra prediction mode for the normal intra prediction if the value of the MPM flag is 1. Meanwhile, if the value of the MPM flag is 0, the decoding apparatus may parse remaining intra mode information from the bitstream, and derive the intra prediction mode of the current block among the intra prediction modes other than the candidate intra prediction modes included in the MPM list based on the remaining intra mode information.

The decoding apparatus may perform the intra prediction based on the intra prediction mode to generate a predicted block.

The decoding apparatus may perform the intra prediction based on the intra prediction mode to generate the predicted block.

As described above, the specific intra prediction type not requiring the signaling of the MPM flag may include the LIP, the MRL intra prediction, and the ISP intra prediction.

Figure 20:
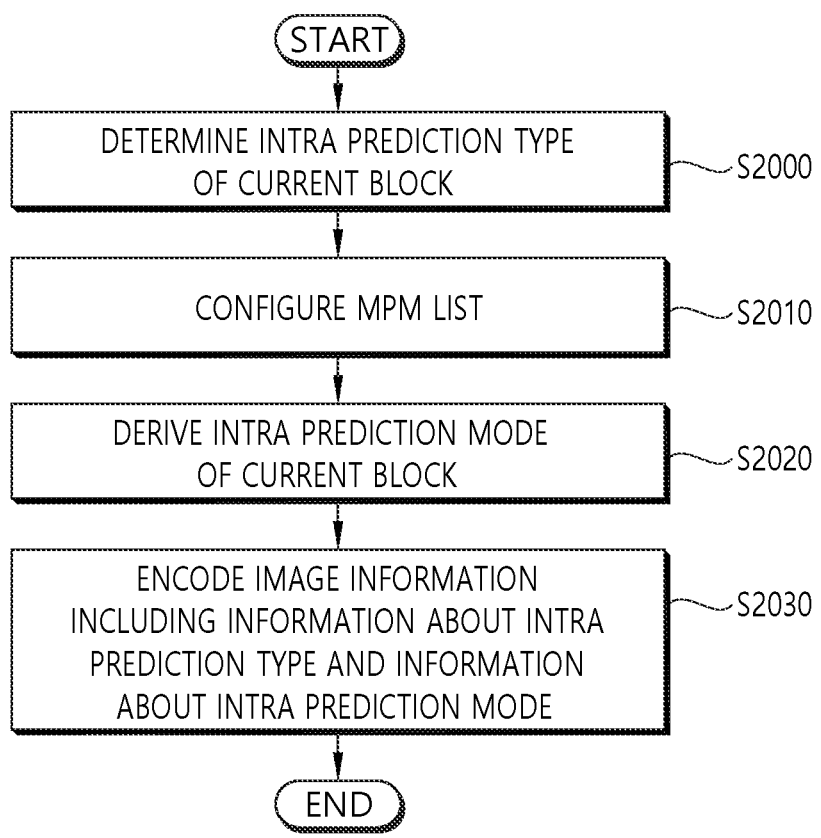
FIGS. 20 and 21 schematically illustrate an example of a video/image encoding method including the intra prediction method according to the exemplary embodiment of the present disclosure and related components.
Figure 21:
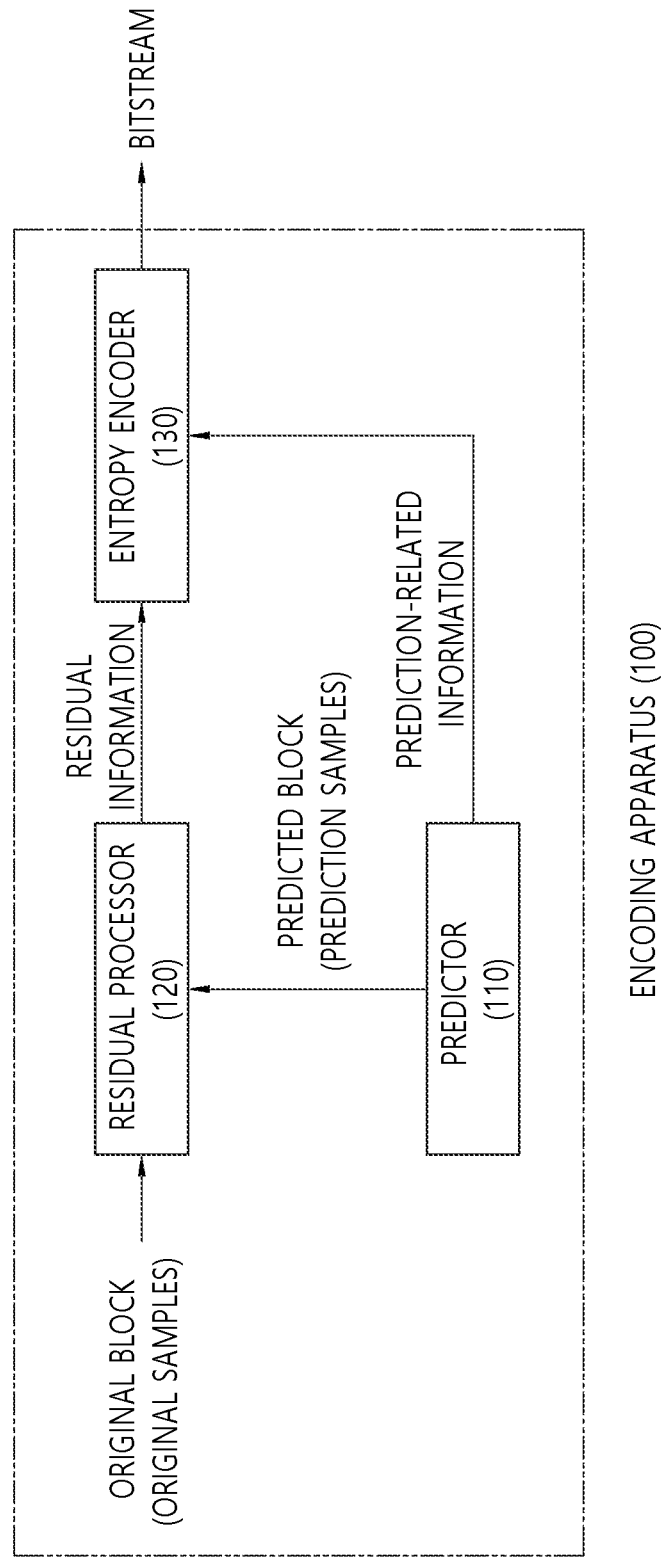

FIGS. 20 and 21 schematically illustrate an example of a video/image encoding method including the intra prediction method according to the exemplary embodiment of the present disclosure and related components. The method illustrated in FIG. 20 may be performed by the encoding apparatus illustrated in FIG. 1. Specifically, for example, S2000 to S2020 illustrate in FIG. 20 may be performed by the predictor 110 of the encoding apparatus, and S2030 illustrated in FIG. 20 may be performed by the entropy encoder 130 of the encoding apparatus. The method illustrated in FIG. 20 may include the aforementioned exemplary embodiments in this document.

Referring to FIG. 20, the encoding apparatus determines an intra prediction type of a current block (S2000). The encoding apparatus may determine whether a specific intra prediction type not requiring the signaling of an MPM flag is applied to the current block. As described above, the specific intra prediction type may include at least one of LIP, MRL intra prediction, and ISP intra prediction. Alternatively, the encoding apparatus may also determine whether the normal intra prediction type requiring the signaling of the MPM flag is applied to the current block. The encoding apparatus may generate information about the intra prediction type of the current block.

The encoding apparatus configures an MPM list of the current block (S2010). The MPM list may be configured in various methods as described above in this document. The MPM list may be derived based on the intra prediction modes of the neighboring blocks of the current block and predetermined default modes. The MPM list may include (MPM) candidate intra prediction modes of the current block.

The encoding apparatus derives an intra prediction mode of the current block based on the MPM list (S2020). The encoding apparatus may derive an optimal intra prediction mode as the intra prediction mode of the current block based on RDO. The encoding apparatus may generate information about the intra prediction mode of the current block. The MPM list configuration and the intra prediction mode derivation procedure may include the aforementioned procedure in FIGS. 12 to 15 or the like. The encoding apparatus may derive the intra prediction mode based on the intra prediction type and generate the information about the intra prediction mode.

The encoding apparatus may encode image information including the information about the intra prediction type and the information about the intra prediction mode (S2030). The encoded image information may be output in a bitstream form. The bitstream may be transmitted to the decoding apparatus through a network or a storage medium.

Prediction-related information may include the information about the intra prediction type and the information about the intra prediction mode. As described above, the information about the intra prediction type may include an LIP flag, a multi-reference line index, and/or an ISP flag. The information about the intra prediction mode may include at least one of the aforementioned MPM flag, MPM index, and remaining mode information. As described above, the image information may include residual information. The residual information may represent (quantized) transform coefficients about residual samples of the current block.

For example, if the intra prediction type represents the specific intra prediction type, the bit for the MPM flag may not be included in the bitstream.

For example, if the intra prediction type represents the normal intra prediction type, one or more bits for each of the MPM flag and the MPM index may be included in the bitstream.

For example, if the intra prediction type represents the specific intra prediction type, the encoding apparatus may search for the intra prediction mode of the current block only among the candidate intra prediction modes within the MPM list.

The specific intra prediction type may include at least one of a linear interpolation intra prediction (LIP) type, a multi-reference line (MRL) intra prediction type, or an intra sub-partitions (ISP) intra prediction type.

For example, the specific intra prediction type may include the LIP type, the information about the intra prediction type may include the LIP flag, and a value of the LIP flag, which is 1, may indicate that the LIP type is applied to the current block.

For example, the specific intra prediction type may include the MRL intra prediction type, the information about the 기 intra prediction type may include a multi-reference line index (for example, intra_luma_ref–idx), and a value of the multi-reference line index larger than 0 may indicate that the MRL intra prediction type is applied to the current block.

For example, the specific intra prediction type may include the ISP intra prediction type, the information about the intra prediction type may include an ISP flag, and a value of the ISP flag, which is 1, may indicate that the ISP intra prediction type is applied to the current block.

If the intra prediction type represents the specific intra prediction type, the intra prediction mode of the current block may be limited to one of the candidate intra prediction modes within the MPM list.

Figure 22:
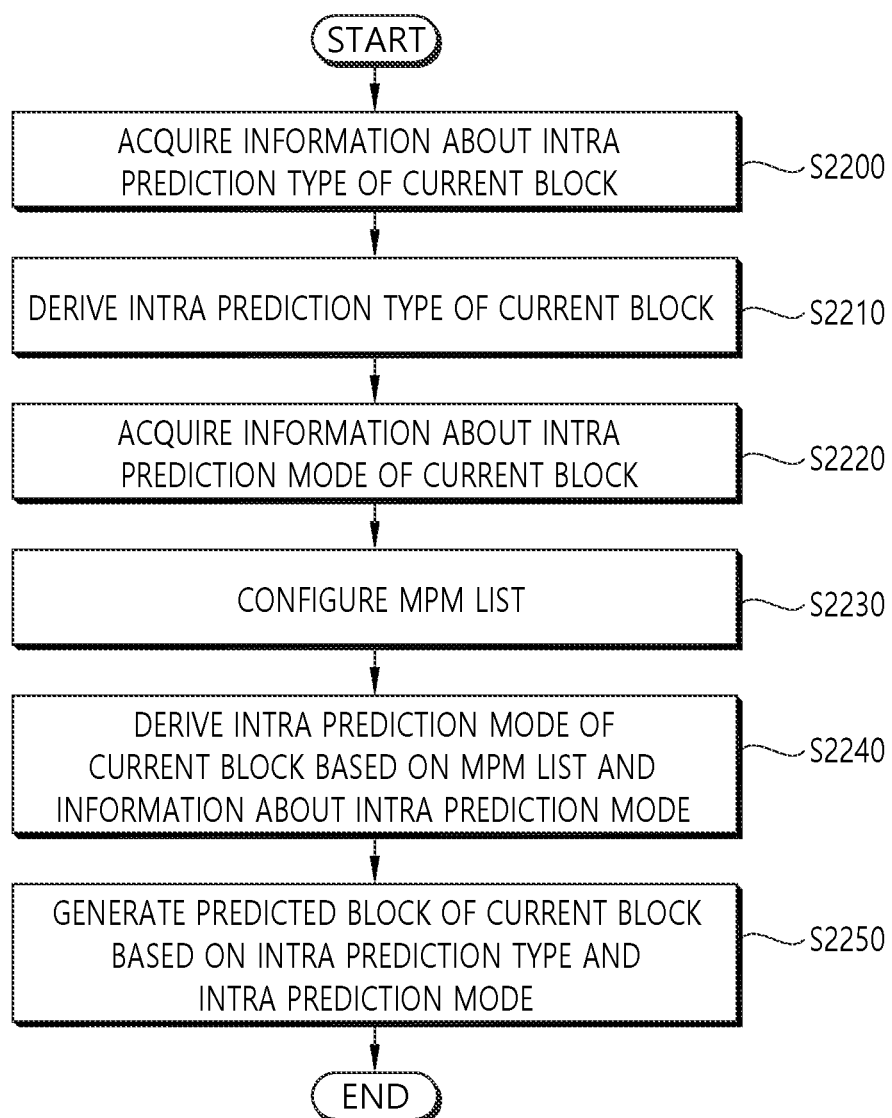
FIGS. 22 and 23 schematically illustrate an example of the intra prediction method according to the exemplary embodiment of the present disclosure and related components.
Figure 23:
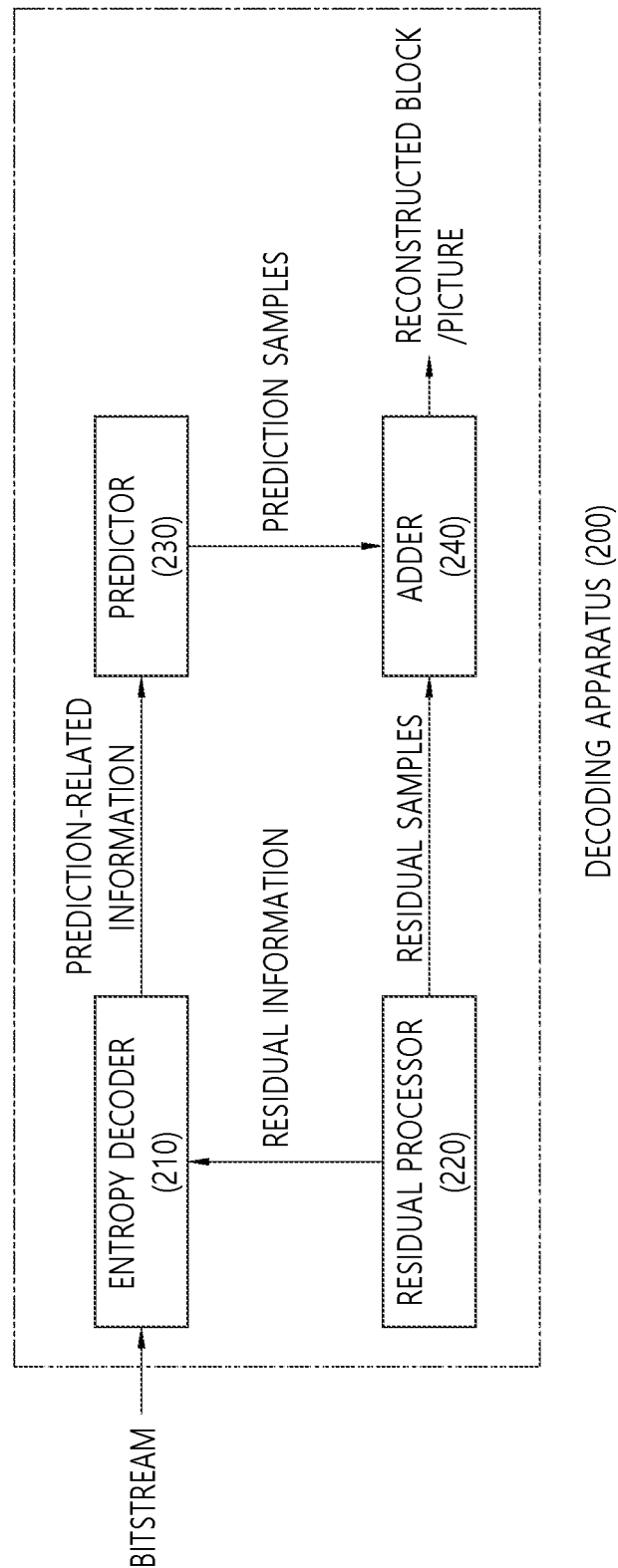

FIGS. 22 and 23 schematically illustrate an example of the intra prediction method according to the exemplary embodiment of the present disclosure and related components. The method illustrated in FIG. 22 may be performed by the decoding apparatus illustrated in FIG. 2. Specifically, for example, S2200 illustrated in FIG. 22 may be performed by the entropy decoder 210 of the decoding apparatus, and S2210 to S2250 may be performed by the predictor 230 of the decoding apparatus. The method illustrated in FIG. 22 may include the aforementioned exemplary embodiments in this document.

Referring to FIG. 22, the decoding apparatus acquires information about an intra prediction type for a current block from a bitstream (S2200). As described above, the information about the intra prediction type may include an LIP flag, a multi-reference line index, and/or an ISP flag.

The decoding apparatus derives the intra prediction type of the current block based on the information about the intra prediction type (S2210).

The decoding apparatus acquires information about an intra prediction mode of the current block from the bitstream (S2220). The information about the intra prediction mode may include at least one of the aforementioned MPM flag, MPM index, and remaining mode information.

The decoding apparatus configures a most probable mode (MPM) list including candidate intra prediction modes of the current block based on neighboring blocks of the current block (S2230). The MPM list may be configured in various methods as described above in this document. The MPM list may be derived based on the intra prediction modes of the neighboring blocks of the current block and predetermined default modes. The MPM list may include (MPM) candidate intra prediction modes of the current block.

The decoding apparatus derives an intra prediction mode of the current block based on the MPM list and the information about the intra prediction mode (S2240).

The decoding apparatus generates a predicted block of the current block based on the intra prediction type and the intra prediction mode (S2250). The predicted block includes prediction samples of the current block. As described above, a reconstructed block/picture may be generated based on the predicted block. As described above, the decoding apparatus may acquire residual information from the bitstream, and the reconstructed block/picture may be generated further based on the residual information. Thereinafter, in order to improve subjective/objective image qualities as necessary, an in-loop filtering procedure such as a deblocking filtering, a SAO, and/or an ALF procedure may be applied to the reconstructed picture, as described above.

For example, if the intra prediction type represents the specific intra prediction type, the decoding apparatus may parse the MPM index without parsing the MPM flag from the bitstream. For example, if the intra prediction type represents the specific intra prediction type, the value of the MPM flag may be derived as 1 without parsing the MPM flag from the bitstream. As another example, if the intra prediction type represents the normal intra prediction type, the decoding apparatus may parse the MPM flag from the bitstream, and parse the MPM index if the value of the MPM flag is 1.

For example, the specific intra prediction type may include at least one of a linear interpolation intra prediction (LIP) type, a multi-reference line (MRL) intra prediction type, or an intra sub-partitions (ISP) intra prediction type.

For example, the specific intra prediction type may include the LIP type, information about the intra prediction type may include an LIP flag, and if a value of the LIP flag is 1, the LIP type may be derived as an intra prediction type of the current block.

For example, the specific intra prediction type may include the MRL intra prediction type, the information about the intra prediction type may include a multi-reference line index, and if a value of the multi-reference line index is larger than 0, the MRL intra prediction type may be derived as an intra prediction type of the current block.

For example, the specific intra prediction type may include the ISP intra prediction type, the information about the intra prediction type may include an ISP flag, and if a value of the ISP flag is 1, the ISP intra prediction type may be derived as an intra prediction type of the current block.

For example, if the intra prediction type represents the specific intra prediction type, the intra prediction mode of the current block may be limited to one of candidate intra prediction modes within the MPM list.

For example, if the intra prediction type represents the normal intra prediction type and the value of the MPM flag is 0, the information about the intra prediction mode may further include remaining intra mode information, and the intra prediction mode of the current block may be derived as one of the remaining intra prediction modes other than the candidate intra prediction modes within the MPM list based on the remaining intra mode information.

In the aforementioned exemplary embodiments, while the methods are described based on the flowcharts shown as a series of steps or blocks, the present disclosure is not limited to the order of steps, and a certain step may occur in different order from or simultaneously with a step different from that described above. In addition, those skilled in the art will understand that the steps illustrated in the flowchart are not exclusive, and other steps may be included or one or more steps in the flowcharts may be deleted without affecting the scope of the present disclosure.

The aforementioned method according to the present disclosure may be implemented in a software form, and the encoding apparatus and/or the decoding apparatus according to the present disclosure may be, for example, included in an apparatus for performing the image processing, such as a TV, a computer, a smart phone, a set top box, or a display apparatus.

When the exemplary embodiments of the present disclosure are implemented in software, the aforementioned method may be implemented by modules (processes, functions, and so on) for performing the aforementioned functions. Such modules may be stored in a memory and executed by a processor. The memory may be internal or external to the processor, and the memory may be coupled to the processor using various well known means. The processor may include an application-specific integrated circuit (ASIC), other chipsets, a logic circuit, and/or a data processing device. The memory may include a read-only memory (ROM), a random access memory (RAM), a flash memory, a memory card, a storage medium, and/or other storage device. That is, the exemplary embodiments described in the present disclosure may be implemented and performed on a processor, a microprocessor, a controller, or a chip. For example, the functional units illustrated in each drawing may be implemented and performed on a computer, a processor, a microprocessor, a controller, or a chip.

In addition, the decoding apparatus and encoding apparatus to which the present disclosure is applied may be included in a multimedia broadcasting a transmitting and receiving device, a mobile communication terminal, a home cinema video device, a digital cinema video device, a surveillance camera, a video chat device, a real time communication device such as video communication, a mobile streaming device, a storage medium, a camcorder, a Video on Demand (VoD) service provider, an Over the top video (OTT) device, an Internet streaming service provider, a 3D video device, a video telephony video device, a medical video device, or the like, and may be used to process video signals or data signals. For example, the Over the top video (OTT) device may include a game console, a Blu-ray player, an Internet access TV, a home theater system, a smartphone, a tablet PC, a digital video recorder (DVR), and the like.

In addition, the processing method to which the present document is applied may be produced in the form of a program executed by a computer, and may be stored in a computer-readable recording medium. Multimedia data having a data structure according to the present document may also be stored in the computer-readable recording medium. The computer-readable recording medium includes all kinds of storage devices and distributed storage devices in which computer-readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. In addition, the computer-readable recording medium also includes media implemented in the form of a carrier wave (for example, transmission over the Internet). In addition, the bitstream generated by the encoding method may be stored in the computer-readable recording medium or transmitted through a wired and wireless communication network. In addition, the exemplary embodiment of the present disclosure may be implemented by a computer program product by a program code, and the program code may be performed in a computer by the exemplary embodiment of the present disclosure. The program code may be stored on a computer-readable carrier.

The contents streaming system to which the present disclosure is applied may largely include an encoding server, a streaming server, a web server, a media storage, a user device, and a multimedia input device.

The encoding server performs the role of generating a bitstream by compressing contents input from multimedia input devices such as a smartphone, a camera, and a camcorder into digital data and transmitting the generated bitstream to the streaming server. As another example, if multimedia input devices such as a smartphone, a camera, and a camcorder directly produce a bitstream, the encoding server may be omitted. The bitstream may be generated by an encoding method or a method for generating a bitstream to which the present disclosure is applied, and the streaming server may temporarily store the bitstream while the bitstream is transmitted or received.

The streaming server performs the role of transmitting multimedia data to a user device based on a user request through a web server, and the web server performs the role of a medium informing the user of which services are available. If the user requests a desired service from the web server, the web server transfers the request to the streaming server, and the streaming server transmits multimedia data to the user. At this time, the contents streaming system may include a separate control server, and in this case, the control server performs the role of controlling commands/responses between devices within the contents streaming system.

The streaming server may receive contents from a media storage and/or an encoding server. For example, if contents are received from the encoding server, the contents may be received in real time. In this case, to provide a smooth streaming service, the streaming server may store the bitstream for a predetermined time.

Examples of the user device may include a mobile phone, a smartphone, a laptop computer, a digital broadcast terminal, a personal digital assistant (PDA), a portable multimedia player (PMP), a navigation terminal, a slate PC, a tablet PC, an ultra-book, a wearable device (for example, a smart watch or a smart glass), a head mounted display (HMD), a digital TV, a desktop computer, a digital signage, or the like. Each individual server within the contents streaming system may be operated as a distributed server, and in this case, data received by each server may be processed in a distributed manner.

What is claimed is:

1. A decoding apparatus for image decoding, the decoding apparatus comprising:
a memory storing instructions; and
at least one processor connected to the memory, the at least one processor executing the instructions to perform operations comprising:
acquiring information about an intra prediction type of a current block from a bitstream;
deriving the intra prediction type of the current block based on the information about the intra prediction type;
acquiring information about an intra prediction mode of the current block from the bitstream;
configuring a most probable mode (MPM) list comprising candidate intra prediction modes of the current block based on neighboring blocks of the current block;
deriving the intra prediction mode of the current block based on the MPM list and the information about the intra prediction mode; and
generating a predicted block of the current block by performing intra prediction based on the intra prediction type and the intra prediction mode,
wherein the intra prediction type includes a first intra prediction type and a second intra prediction type,
wherein, for the first intra prediction type, the intra prediction is performed based on neighboring reference samples in a specific sample line which is not adjacent to a top boundary and a left boundary of the current block,
wherein, for the second intra prediction type, the intra prediction is performed based on neighboring reference samples in a specific sample line which is adjacent to the top boundary and the left boundary of the current block,
wherein, based on the intra prediction type representing the first intra prediction type, the information about the intra prediction mode comprises: an MPM index,
wherein, based on the intra prediction type representing the first intra prediction type, the MPM index is parsed without parsing an MPM flag from the bitstream,
wherein, based on the intra prediction type representing the second intra prediction type, the MPM flag is parsed from the bitstream,
wherein, based on the intra prediction type representing the second intra prediction type, the information about the intra prediction mode comprises the MPM index based on the MPM flag, and
wherein an intra prediction based on the first intra prediction type is performed on the current block based on the intra prediction mode of the current block not being a planar mode.

2. The decoding apparatus of claim 1, wherein the first intra prediction type comprises: a multi-reference line (MRL) intra prediction type,
wherein the information about the intra prediction type comprises: intra_luma_ref_idx, and wherein based on a value of the intra_luma_ref_idx being larger than 0, the MRL intra prediction type is derived as the intra prediction type of the current block.

3. An encoding apparatus for image encoding, the encoding apparatus configured to:
a memory storing instructions; and
at least one processor connected to the memory, the at least one processor executing the instructions to perform operations comprising:
determining an intra prediction type of a current block;
generating information about the intra prediction type of the current block;
configuring a most probable mode (MPM) list comprising candidate intra prediction modes of the current block based on neighboring blocks of the current block;
deriving an intra prediction mode of the current block based on the MPM list;

generating information about the intra prediction mode of the current block; and outputting a bitstream by encoding image information comprising the information about the intra prediction type and the information about the intra prediction mode, wherein the information about the intra prediction mode is generated based on the intra prediction type, wherein the intra prediction type includes a first intra prediction type and a second intra prediction type, wherein, for the first intra prediction type, the intra prediction is performed based on neighboring reference samples in a specific sample line which is not adjacent to a top boundary and a left boundary of the current block, wherein, for the second intra prediction type, the intra prediction is performed based on neighboring reference samples in a specific sample line which is adjacent to the top boundary and the left boundary of the current block, wherein, based on the intra prediction type representing the first intra prediction type, the information about the intra prediction mode comprises: an MPM index, wherein, based on the intra prediction type representing the first intra prediction type, the MPM index is configured to be parsed without parsing an MPM flag from the bitstream and the intra prediction mode of the current block is limited to one of candidate intra prediction modes within the MPM list, wherein, based on the intra prediction type representing the second intra prediction type, the MPM flag is configured to be parsed from the bitstream, wherein, based on the intra prediction type representing the second intra prediction type, the information about the intra prediction mode comprises the MPM index based on the MPM flag, and wherein an intra prediction based on the first intra prediction type is performed on the current block based on the intra prediction mode of the current block not being a planar mode.

4. An apparatus configured to transmit data for an image, the apparatus comprising:

at least one processor configured to obtain a bitstream, wherein the bitstream is generated based on determining an intra prediction type of a current block, generating information about the intra prediction type of the current block, configuring a most probable mode (MPM) list comprising candidate intra prediction modes of the current block based on neighboring blocks of the current block, deriving an intra prediction mode of the current block based on the MPM list, generating information about the intra prediction mode of the current block, and outputting the bitstream by encoding image information comprising the information about the intra prediction type and the information about the intra prediction mode; and a transmitter configured to transmit the data comprising the bitstream, wherein the information about the intra prediction mode is generated based on the intra prediction type, wherein the intra prediction type includes a first intra prediction type and a second intra prediction type, wherein, for the first intra prediction type, the intra prediction is performed based on neighboring reference samples in a specific sample line which is not adjacent to a top boundary and a left boundary of the current block, wherein, for the second intra prediction type, the intra prediction is performed based on neighboring reference samples in a specific sample line which is adjacent to the top boundary and the left boundary of the current block, wherein based on the intra prediction type representing the first intra prediction type, the information about the intra prediction mode comprises: an MPM index, wherein, based on the intra prediction type representing the first intra prediction type, the MPM index is configured to be parsed without parsing an MPM flag from the bitstream and the intra prediction mode of the current block is limited to one of candidate intra prediction modes within the MPM list, wherein, based on the intra prediction type representing the second intra prediction type, the MPM flag is configured to be parsed from the bitstream, wherein, based on the intra prediction type representing the second intra prediction type, the information about the intra prediction mode comprises the MPM index based on the MPM flag, and wherein an intra prediction based on the first intra prediction type is performed on the current block based on the intra prediction mode of the current block not being a planar mode.

* * * * *